Feb. 26, 1957 D. M. ZABRISKIE 2,783,120

FACSIMILE RECORDER

Filed March 29, 1952 22 Sheets-Sheet 1

INVENTOR
D. M. ZABRISKIE

BY [signature]
ATTORNEY

Feb. 26, 1957

D. M. ZABRISKIE 2,783,120

FACSIMILE RECORDER

Filed March 29, 1952

22 Sheets-Sheet 2

INVENTOR
D. M. ZABRISKIE

BY M. J. Reynolds
ATTORNEY

Feb. 26, 1957 D. M. ZABRISKIE 2,783,120

FACSIMILE RECORDER

Filed March 29, 1952 22 Sheets-Sheet 3

INVENTOR
D. M. ZABRISKIE
BY M. J. Reynolds
ATTORNEY

Feb. 26, 1957 D. M. ZABRISKIE 2,783,120

FACSIMILE RECORDER

Filed March 29, 1952 22 Sheets-Sheet 4

INVENTOR
D. M. ZABRISKIE
BY
M. J. Reynolds
ATTORNEY

INVENTOR
D. M. ZABRISKIE
BY M. J. Reynolds
ATTORNEY

INVENTOR
D. M. ZABRISKIE
BY M. J. Reynolds
ATTORNEY

Feb. 26, 1957 D. M. ZABRISKIE 2,783,120

FACSIMILE RECORDER

Filed March 29, 1952 22 Sheets-Sheet 7

INVENTOR
D. M. ZABRISKIE

BY M. J. Reynolds
ATTORNEY

INVENTOR
D. M. ZABRISKIE
BY M. J. Reynolds
ATTORNEY

Feb. 26, 1957

D. M. ZABRISKIE 2,783,120

FACSIMILE RECORDER

Filed March 29, 1952

22 Sheets-Sheet 9

INVENTOR
D. M. ZABRISKIE

BY M. J. Reynolds
ATTORNEY

Feb. 26, 1957 D. M. ZABRISKIE 2,783,120

FACSIMILE RECORDER

Filed March 29, 1952 22 Sheets-Sheet 10

INVENTOR
D. M. ZABRISKIE

BY M. J. Reynolds

ATTORNEY

INVENTOR
D. M. ZABRISKIE
BY M. J. Reynolds
ATTORNEY

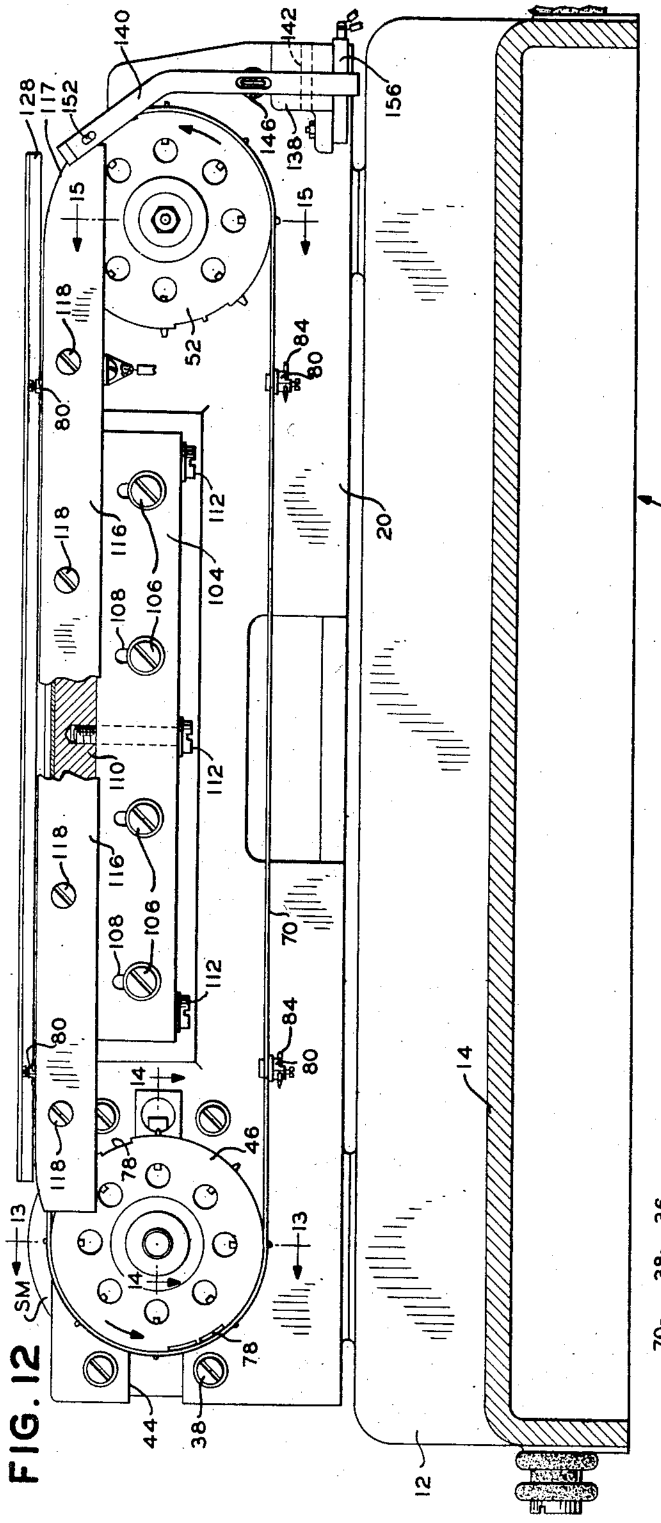
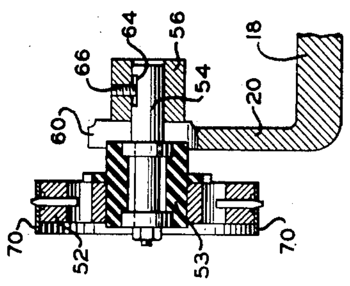
FIG. 15
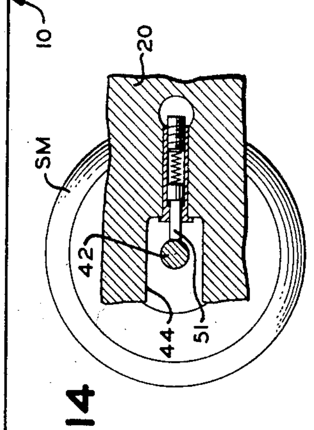
FIG. 14
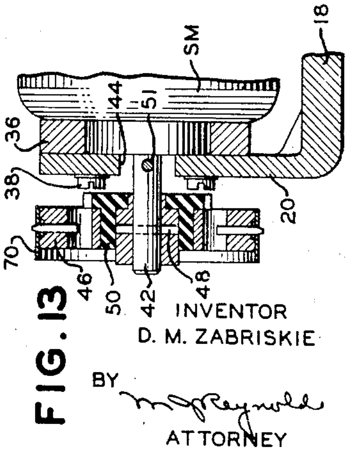
FIG. 13
INVENTOR
D. M. ZABRISKIE
BY [signature]
ATTORNEY INVENTOR
D. M. ZABRISKIE
BY M. J. Reynolds
ATTORNEY INVENTOR
D. M. ZABRISKIE
BY [signature]
ATTORNEY INVENTOR
D. M. ZABRISKIE
BY [signature]
ATTORNEY

FACSIMILE RECORDER

Filed March 29, 1952

INVENTOR
D. M. ZABRISKIE

BY
M. J. Reynolds
ATTORNEY

INVENTOR
D. M. ZABRISKIE
BY [signature]
ATTORNEY

Feb. 26, 1957 D. M. ZABRISKIE 2,783,120

FACSIMILE RECORDER

Filed March 29, 1952 22 Sheets-Sheet 18

INVENTOR
D. M. ZABRISKIE

BY [signature]
ATTORNEY

INVENTOR
D. M. ZABRISKIE
BY
ATTORNEY

Feb. 26, 1957 D. M. ZABRISKIE 2,783,120

FACSIMILE RECORDER

Filed March 29, 1952 22 Sheets-Sheet 20

INVENTOR
D. M. ZABRISKIE

BY
M. J. Reynolds
ATTORNEY

Feb. 26, 1957 D. M. ZABRISKIE 2,783,120

FACSIMILE RECORDER

Filed March 29, 1952 22 Sheets-Sheet 21

INVENTOR.
D. M. ZABRISKIE

BY

M. J. Reynolds

ATTORNEY

Feb. 26, 1957 D. M. ZABRISKIE 2,783,120

FACSIMILE RECORDER

Filed March 29, 1952 22 Sheets-Sheet 22

INVENTOR.
D. M. ZABRISKIE

BY

[signature]

ATTORNEY 2,783,120

FACSIMILE RECORDER

Douglas M. Zabriskie, Northvale, N. J., assignor to The Western Union Telegraph Company, New York, N. Y., a corporation of New York Application March 29, 1952, Serial No. 279,261

10 Claims. (Cl. 346—139)

My invention relates to fascimile recorders and its object is to provide a multi-stylus page type recorder adapted to operate at high speed on a continuous sheet so as to be capable of reproducing graphic material at least about ten times faster than is possible with equipment previously available.

Prior recorders of the 3-stylus belt type were constructed to operate at the standard recording speed of 180 lines a minute and the linear speed of the styluses across the sheet was about 115 feet a minute. To meet the practical requirements of a high speed facsimile system for handling a large mass of material rapidly, the present recorder was designed to have a recording speed of 1800 eight and one-half inch lines a minute scanning at 120 lines per inch, and that demanded a stylus surface speed of over 15,000 inches per minute. This enormous stylus speed presented various new problems in the recording apparatus and their solution requires novel features of construction, as will be pointed out in due course.

In its general operation the recorder is fully automatic in that the recorded message of whatever length within given limits is automatically cut off from the roll of recording paper and delivered to a receptacle. Upon completion of one recording, the machine is instantly ready for the next message. The cutting and deliveries of the recorded message are carried out so rapidly that a completed recording will not interfere with an immediately succeeding one. The machine is adjustable for messages of different length—in the present design this message may vary from 2 to 14½ inches.

In its general construction, the recorder of this invention comprises two main components, namely, a paper feed mechanism and a stylus driving mechanism. The paper feed mechanism is attached permanently to a base casting and the stylus drive mechanism is adjustably mounted on the base as a detachable unit to permit the installation of a new belt when required.

The paper feed mechanism is so constructed that the recording paper passes from a supply roll downward through a curved guide chute, then is pulled upward by a two-speed motor driven feed roller through a fixed vertical guide over a pivoted platen bar which supports the paper in scanning position. From the platen bar the recorded paper moves up past the blades of a motor driven cutter and then between a pair of delivery rolls which move the severed recorded sheet out of the machine to a suitable receptacle.

The two-speed paper feed roll is operated by two synchronous motors mounted at opposite ends of the roll which is driven at low speed for recording and at high speed for rapidly feeding out a predetermined length of unrecorded paper. This length is accurately measured by a feed motor either to provide a uniform margin below the recording or to provide a sheet of selected uniform length up to 14½ inches, regardless of the length of the message.

The platen carried by the feed mechanism is a rigid bar pivoted on a short radius so that it cannot twist about its pivots. An adjustable leaf spring exerts pressure against the platen so that the paper is constantly held in yieldable contact with the stylus points. This novel platen structure has been found to be superior for high speed use for it provides a stable bounceless support for the paper under the action of the fast moving stylus. This novel platen structure is one of the major factors contributing to the successful operation of this high speed recorder.

The short interval between successive recordings makes it necessary to cut the paper while the styluses are in motion, and to prevent the paper from being torn by the stylus points during the cutting action I have provided automatic means for withdrawing the paper out of contact with the styluses by moving the platen rearward. In other words, the paper supported by the platen engages the styluses only while recording is taking place.

In the present embodiment of my invention, the stylus drive mechanism operates with four styluses mounted on an endless belt. The high speed at which this belt must be driven presented special problems not inherent in the 3-stylus low speed machines where it was standard practice to support the scanning run of the belt in a straight line tangential to the pulleys. That arrangement of the stylus belt was satisfactory enough in its prior machines because at the low speed of the belt there was no excessive friction resulting from the belt guiding elements.

However, the high surface speed of the belt required in the present machines made the other old belt arrangement impractical. It was found that forcing the scanning run of the belt into a straight line tangential to the pulleys caused excessive stresses and friction to be exerted on the belt due to centrifugal force. In consequency, an undue frictional load was placed on the driving motor and the belt would break under its strain after a short period of running at high speed.

This difficulty was overcome by lengthening the belt and supporting it in such a position that its upper or scanning run is located slightly above the pulley tangential line. As a result the belt is able to follow the natural curvature of its centrifugal path on leaving and approaching the pulleys. In this way the belt operates without undue friction and strain whereby it can be driven at the required high speed by a small synchronous motor and its life is greatly prolonged.

The lengthened stylus belt in this high speed machine requires more than the conventional 3 styluses used in prior low speed machines and at the present time the belt carries 4 styluses. The practical advantage of this stylus arrangement lies in the fact that the styluses do not strike the paper on the platen until each stylus has passed over the pulley and has settled in the straight scanning run of the belt. This reduces the impact of the entering stylus point on the paper and prevents it from being mutilated.

The various novel features of this high speed recorder and their practical advantages will be understood from a full description of the accompanying drawings which represent a commercial embodiment of my invention as used at the present time. In these drawings.

Figures 2, 2A:
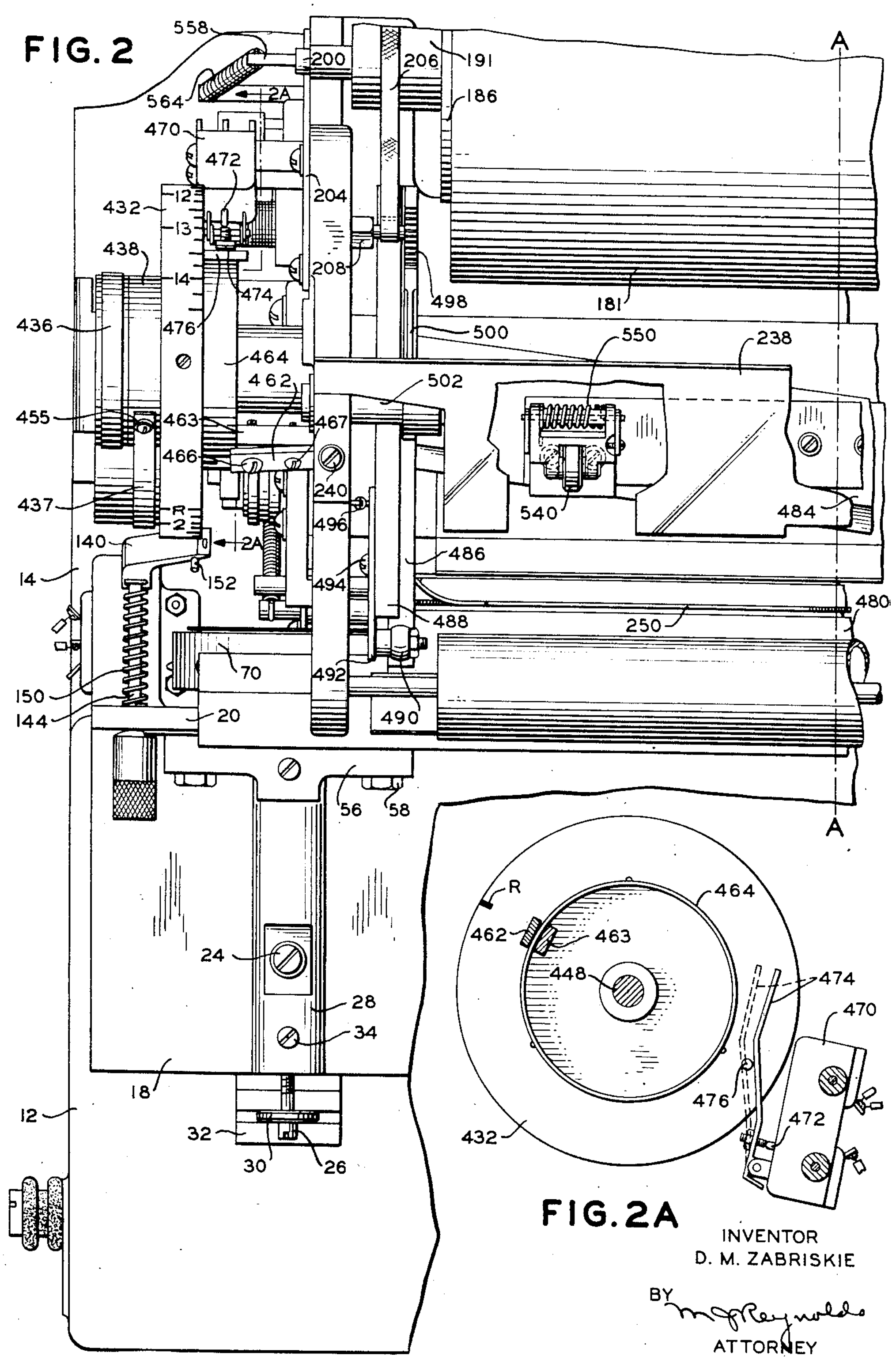
Figure 3:
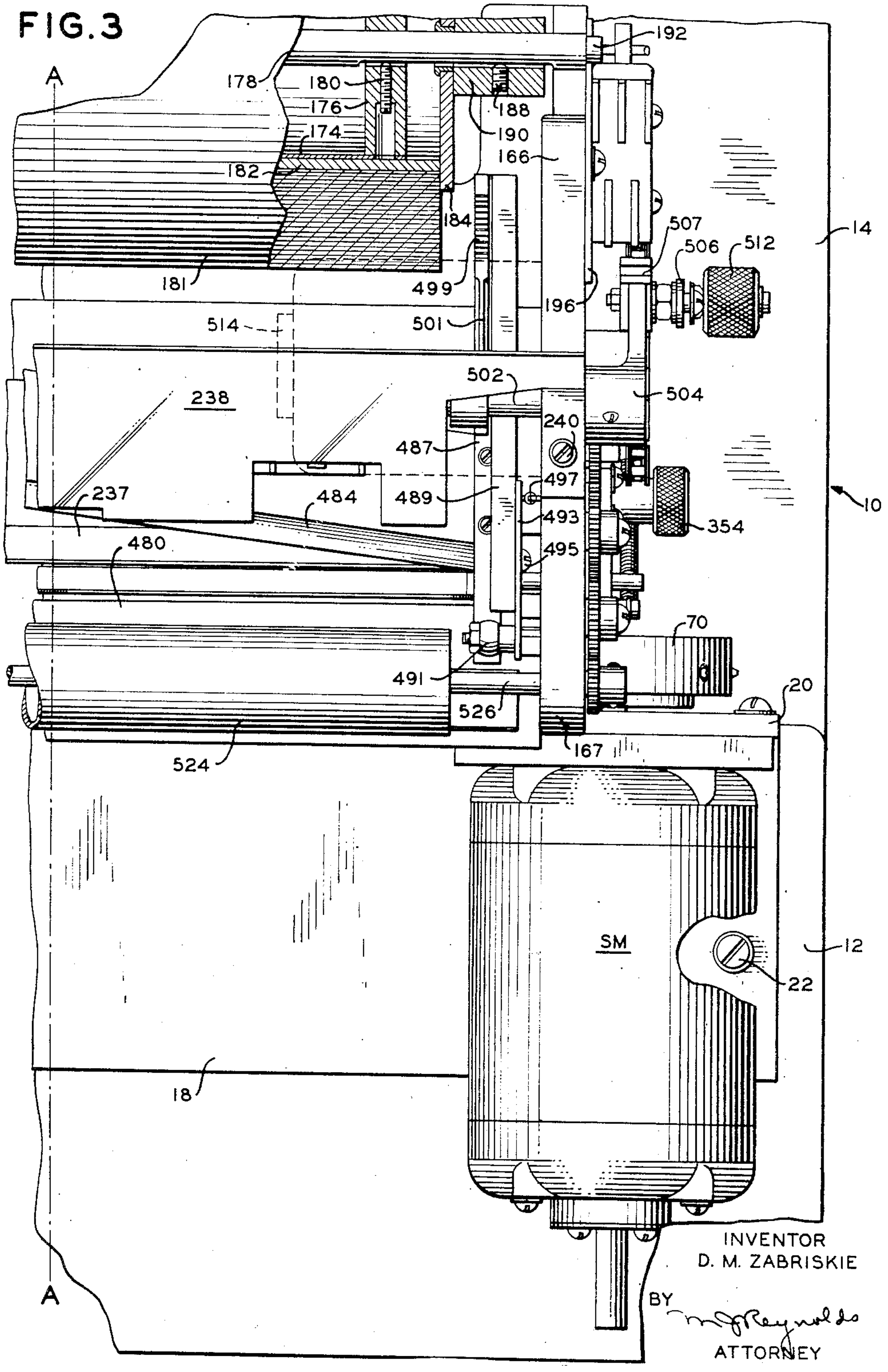
Figure 4:
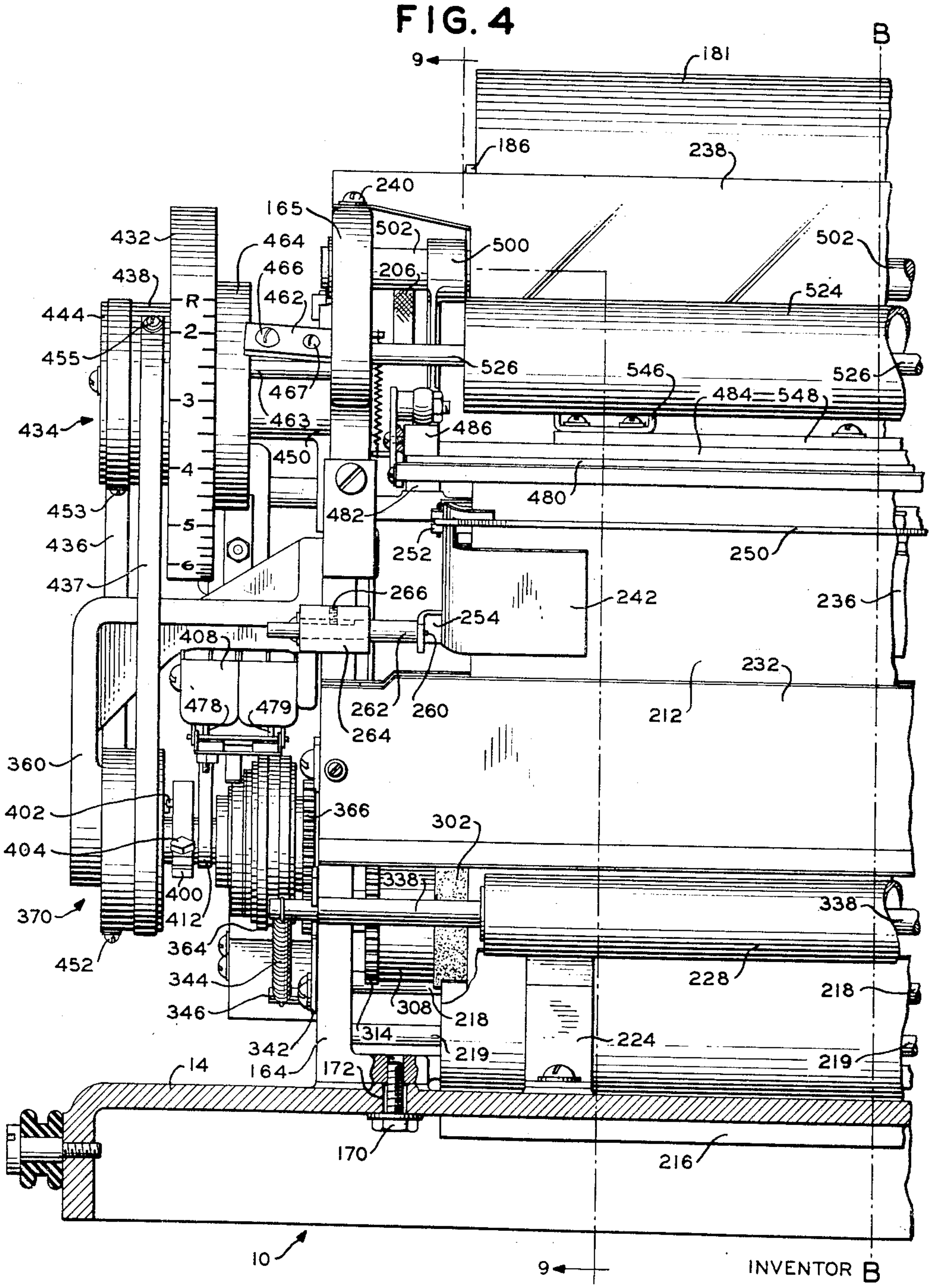
Figure 5:
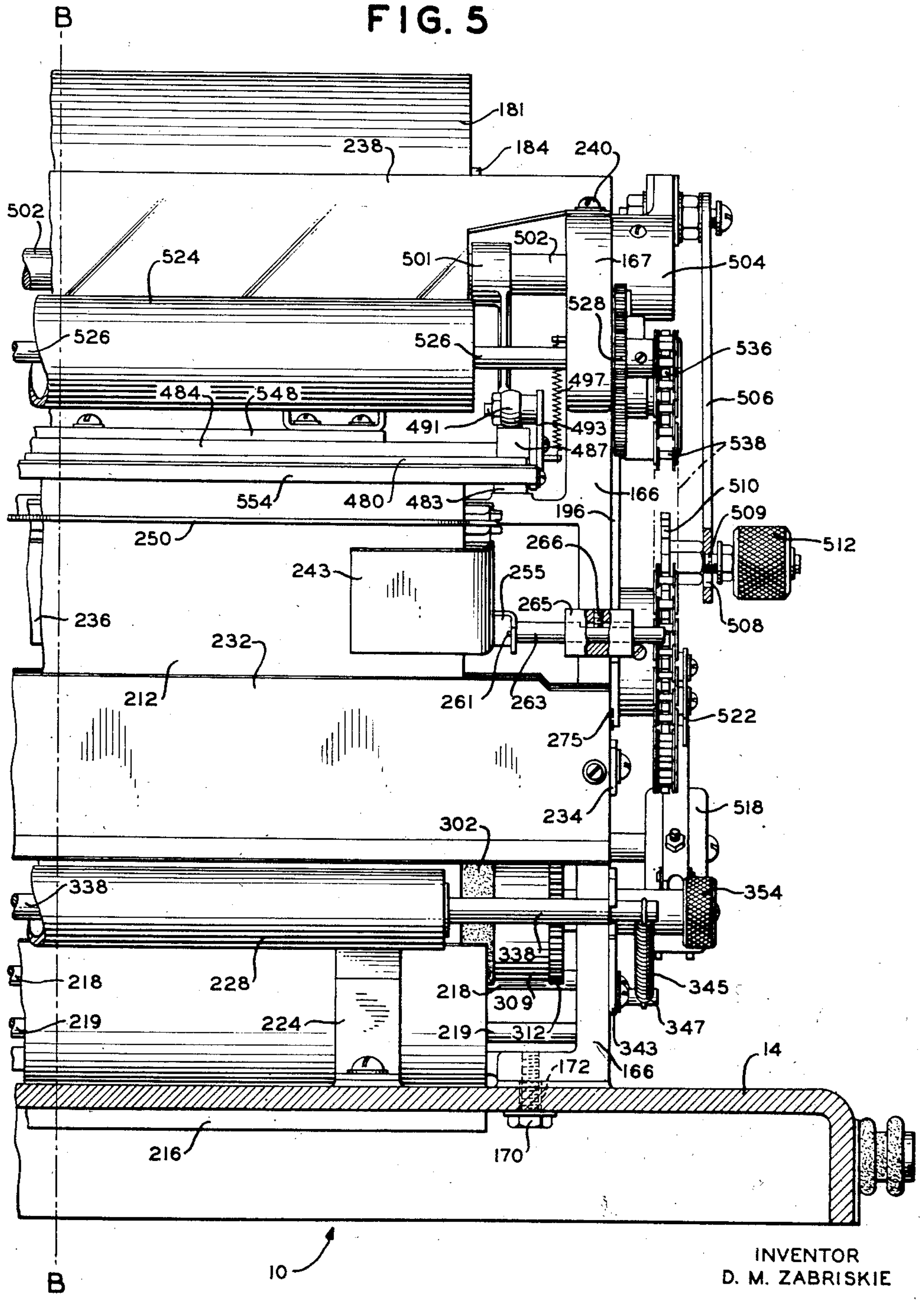
Figure 6:
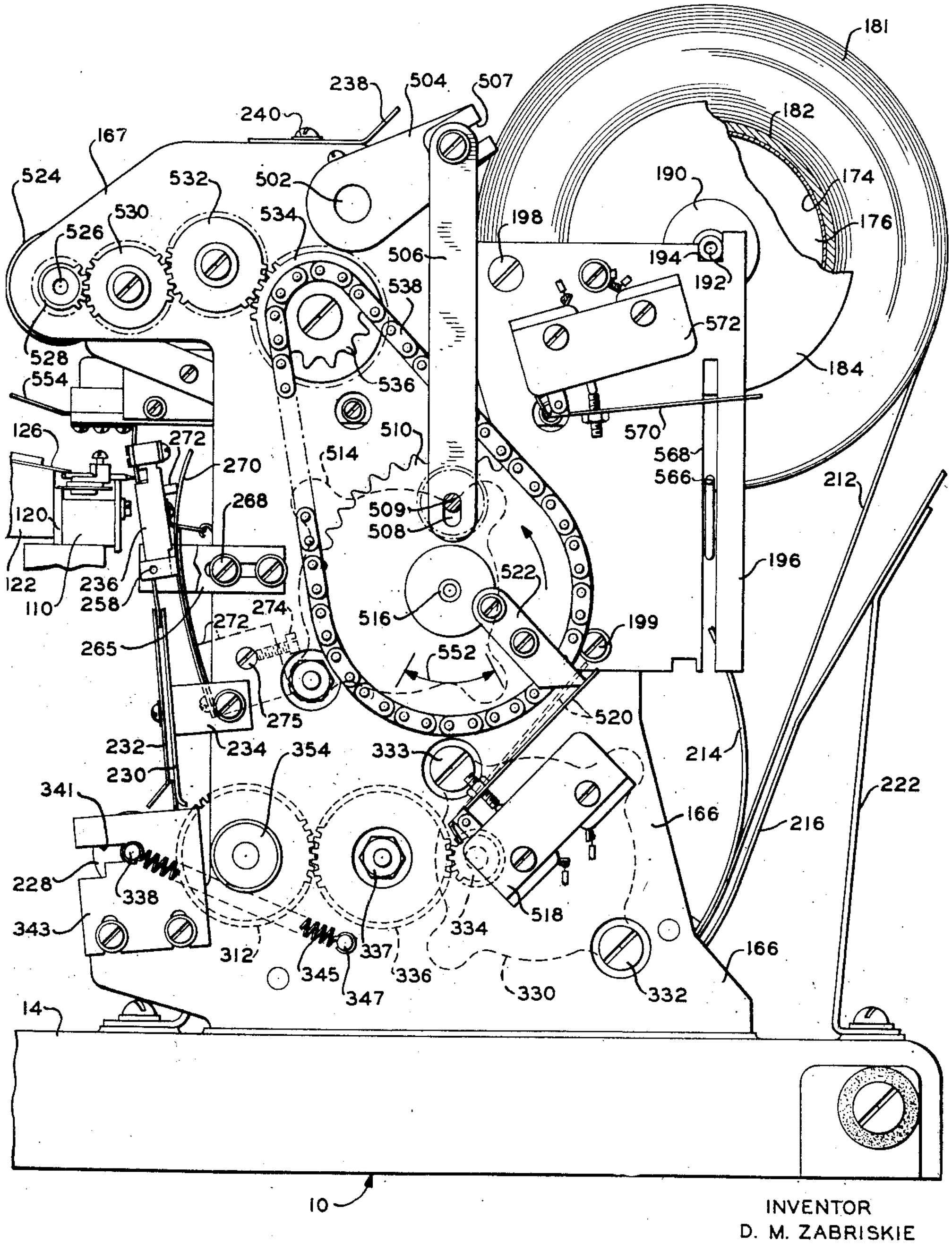
Figure 7:
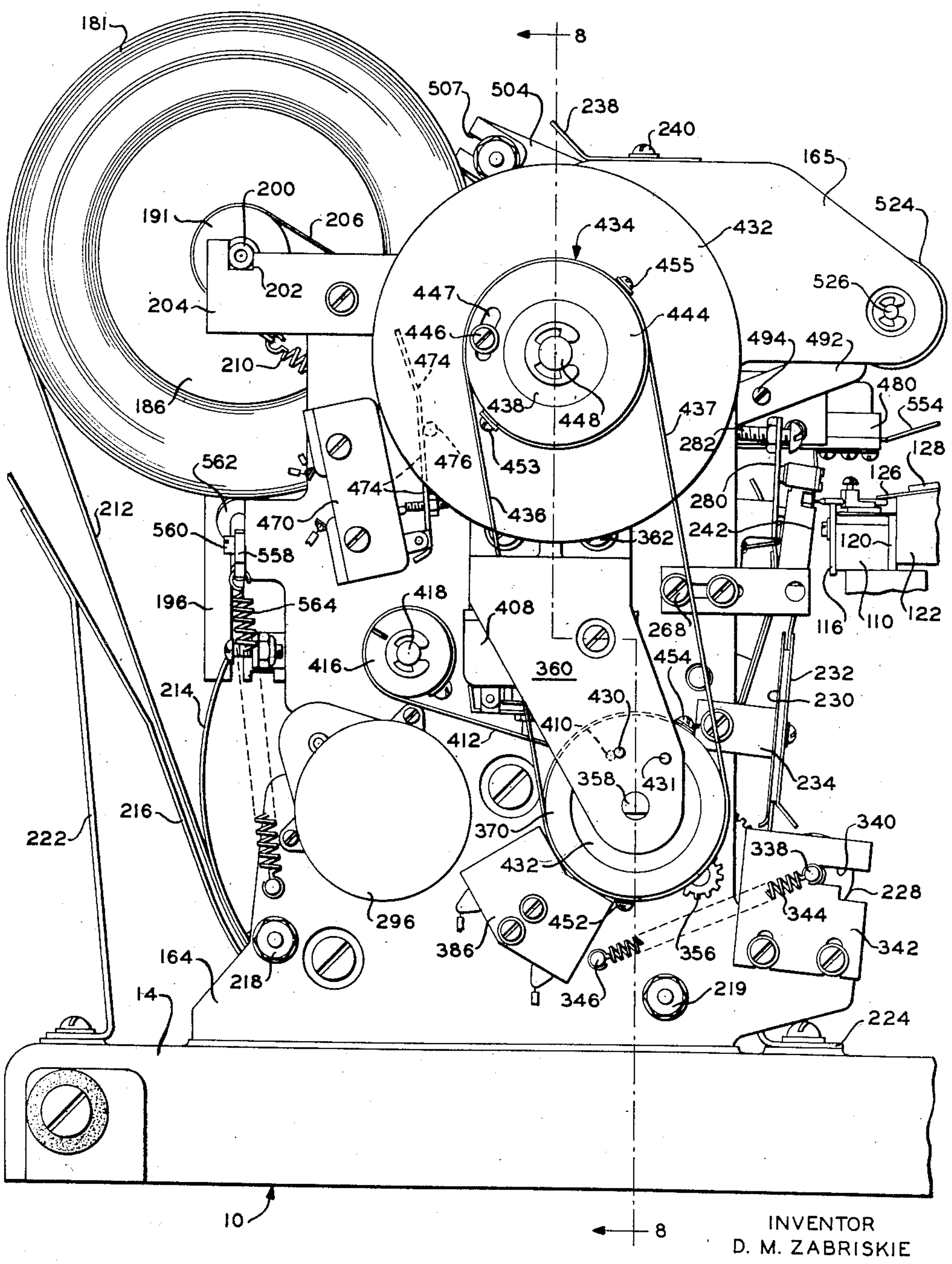
Figure 8:
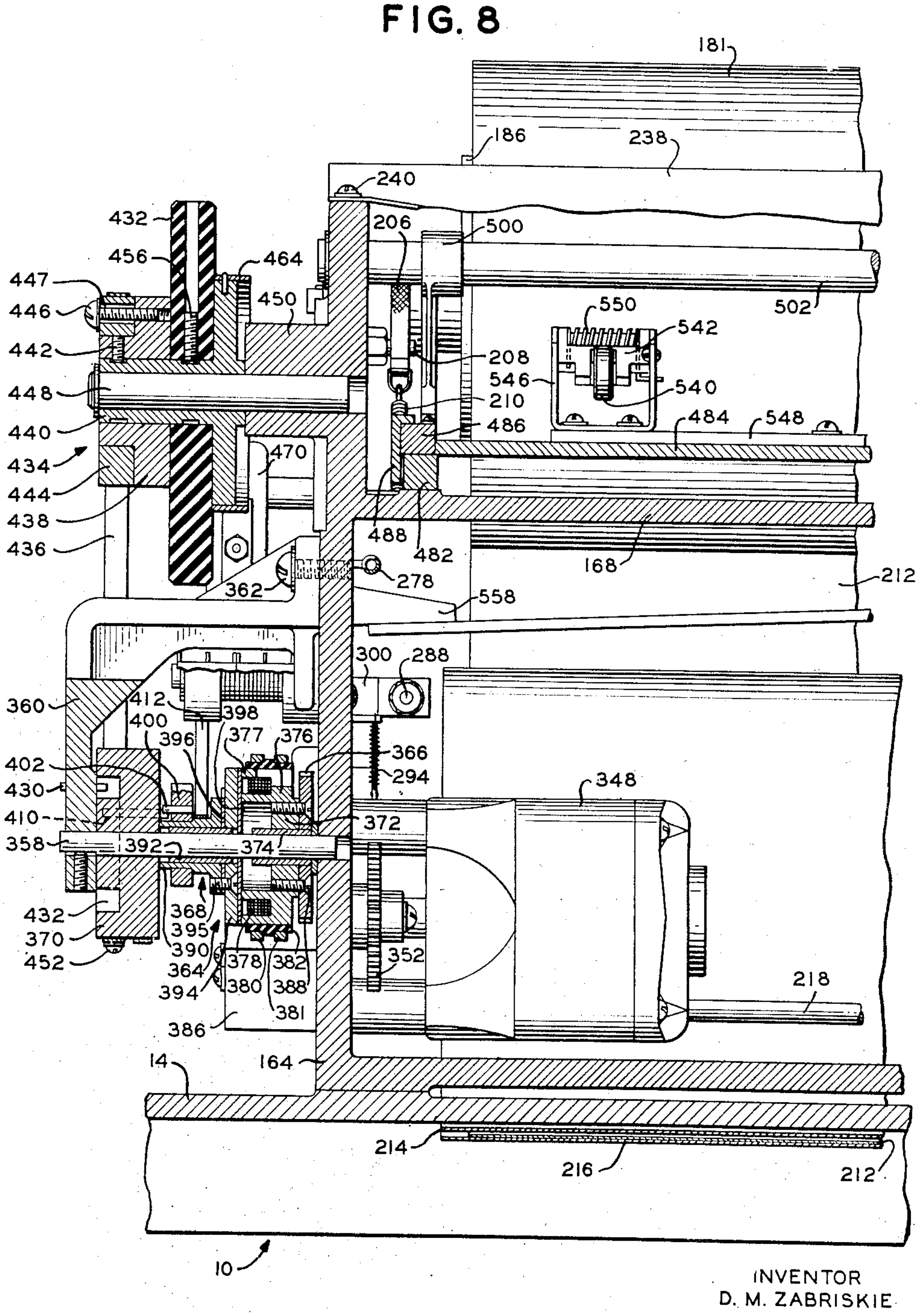
Figure 9:
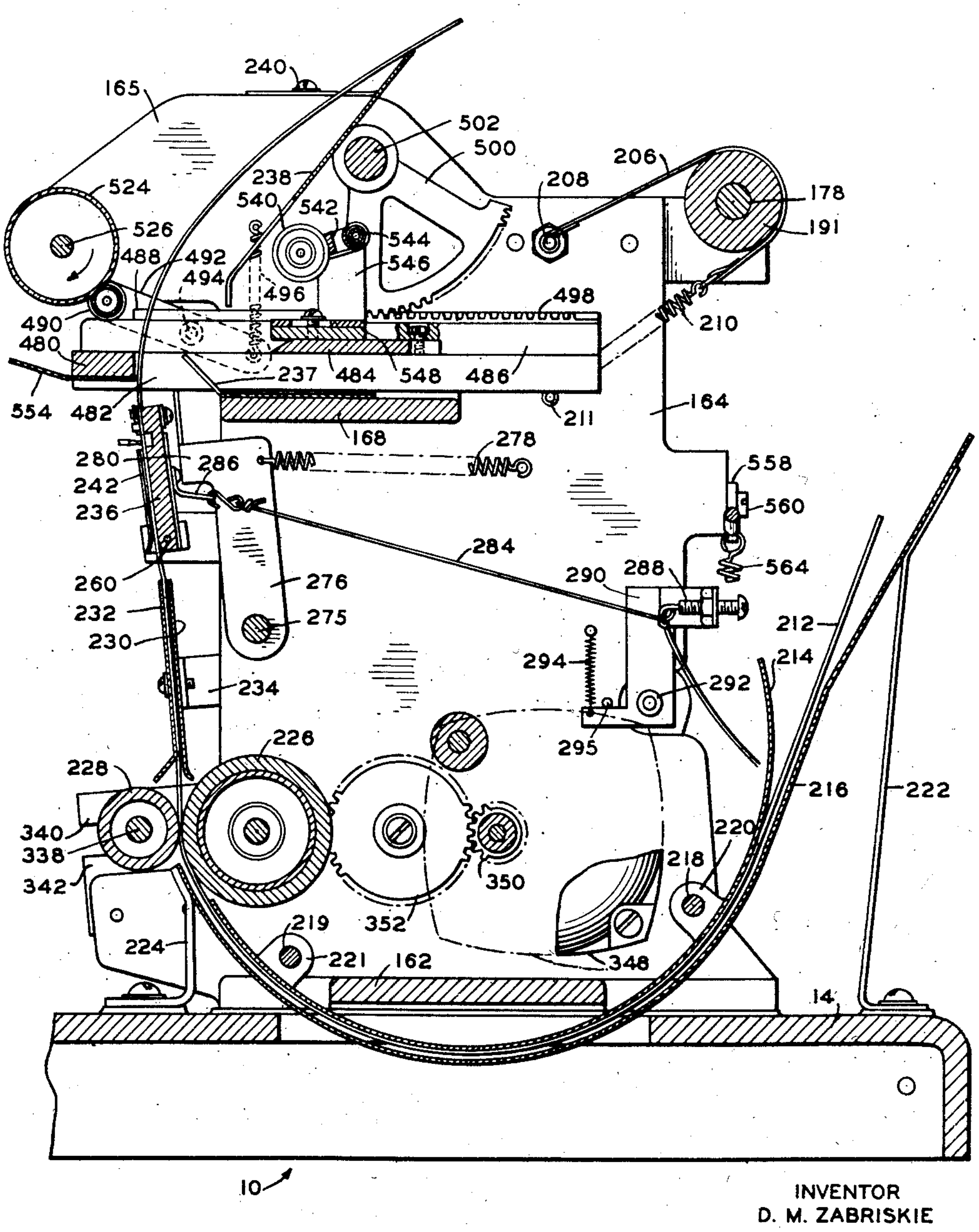
Figure 10:
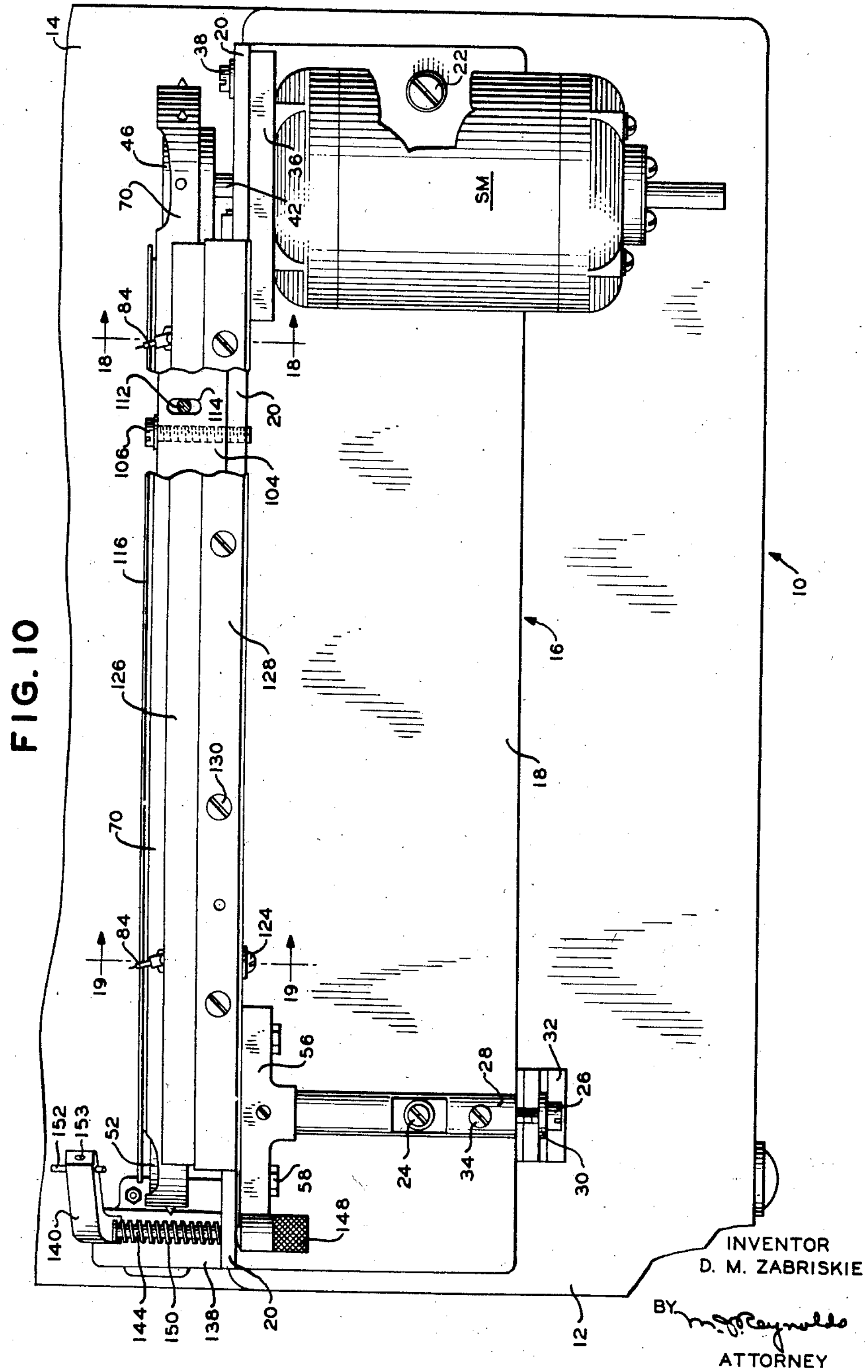
Figure 11:
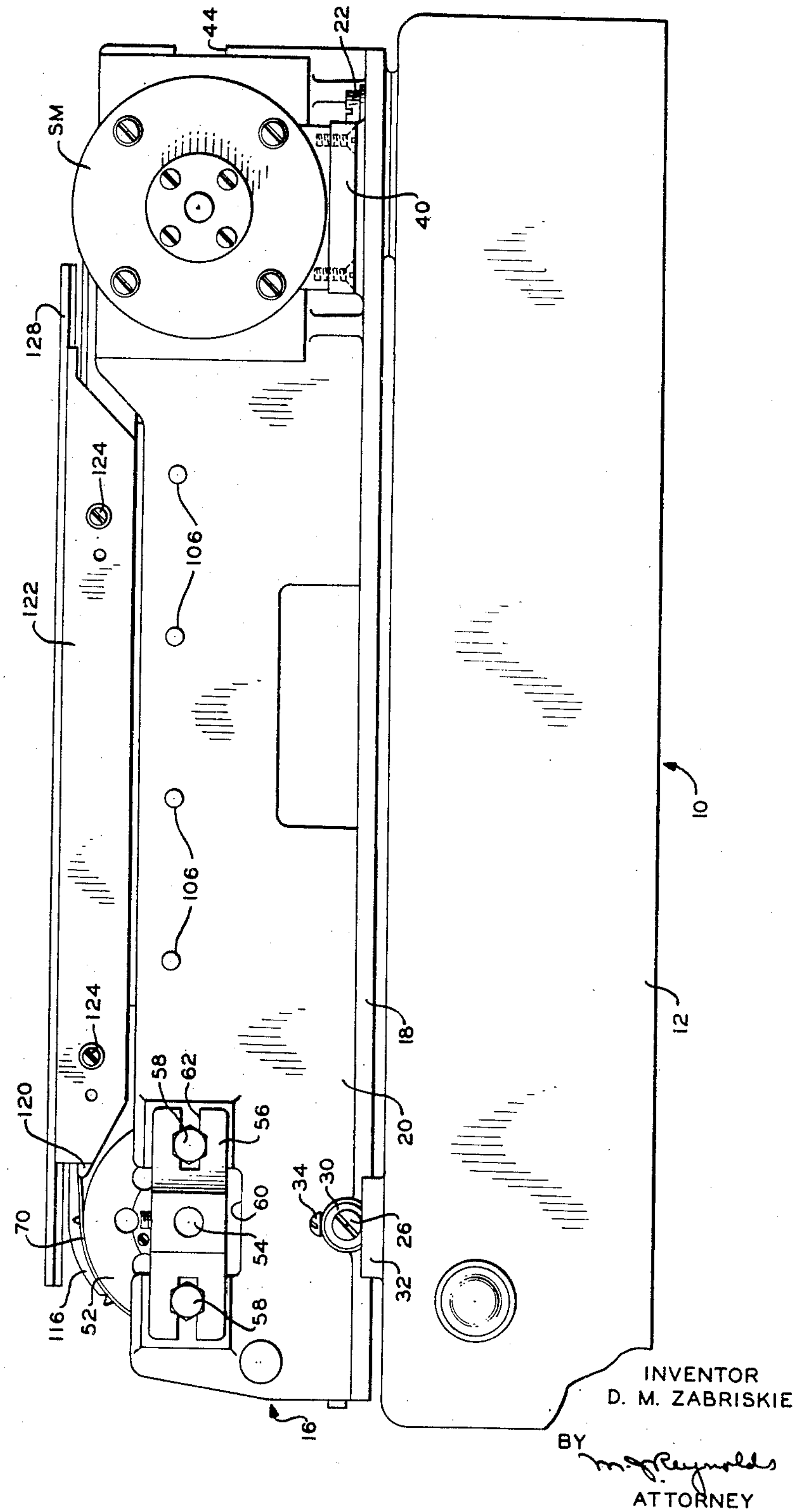
Figure 16:
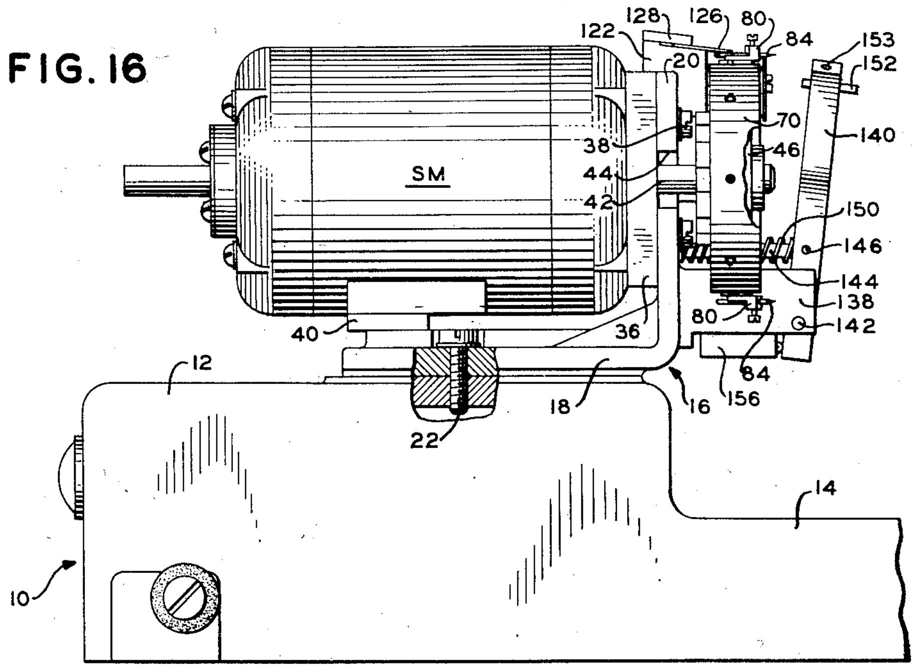
Figure 17:
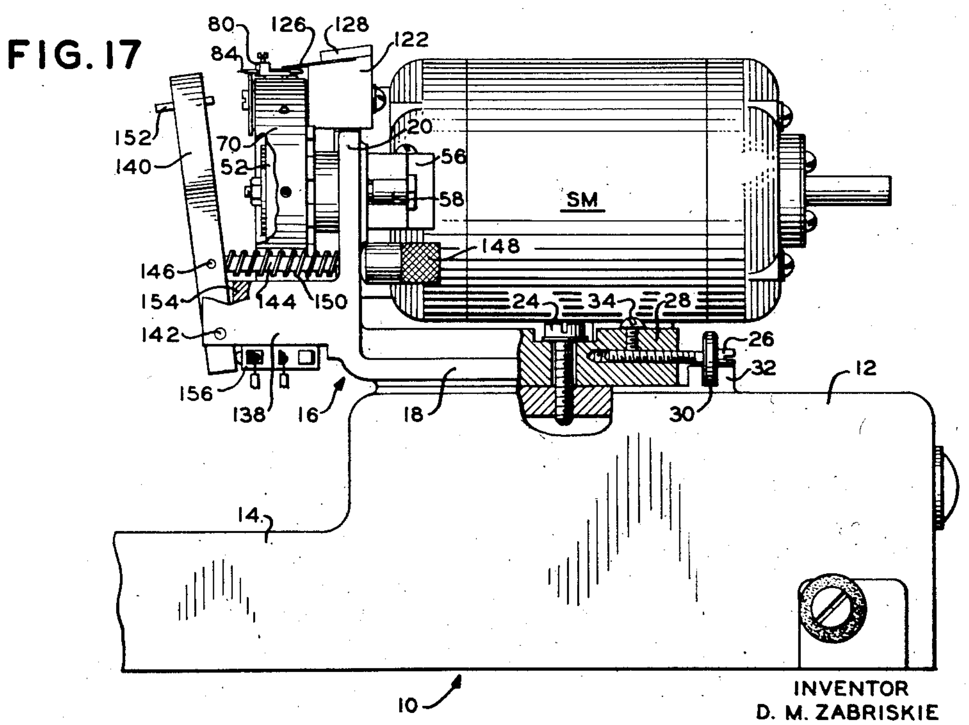
Figures 18, 19, 20:
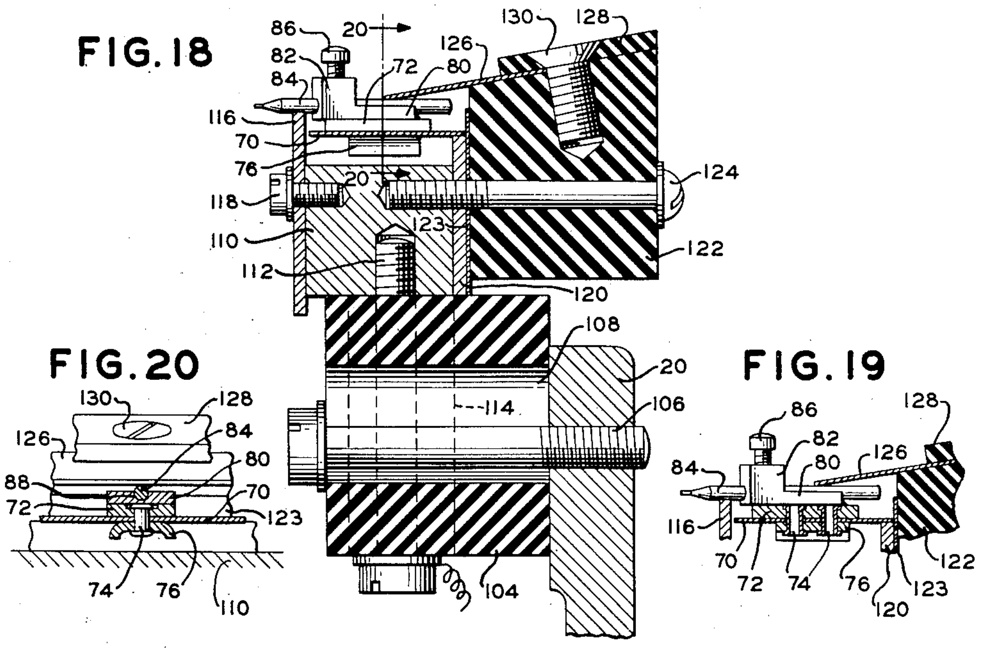
Figure 21:
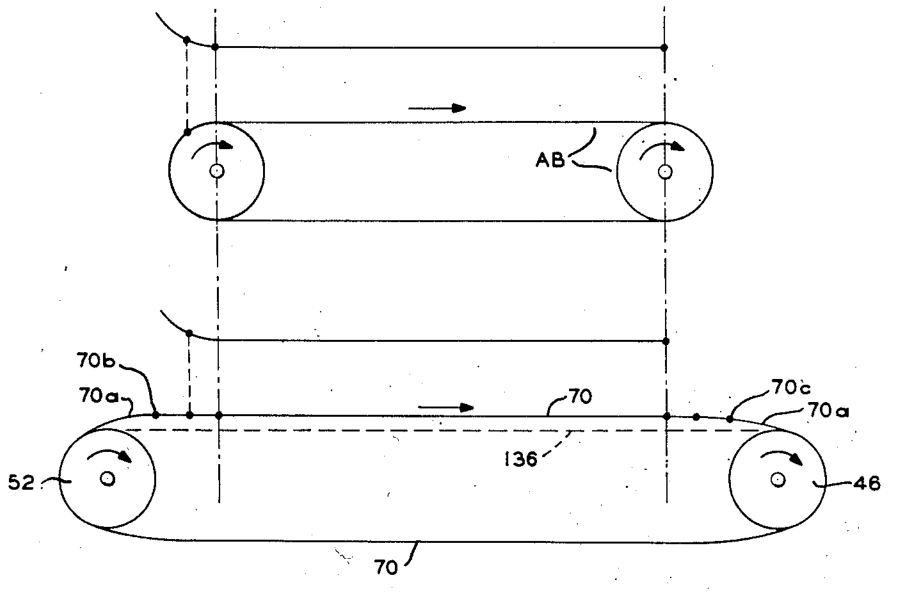
Figures 22, 22A, 22B, 23:
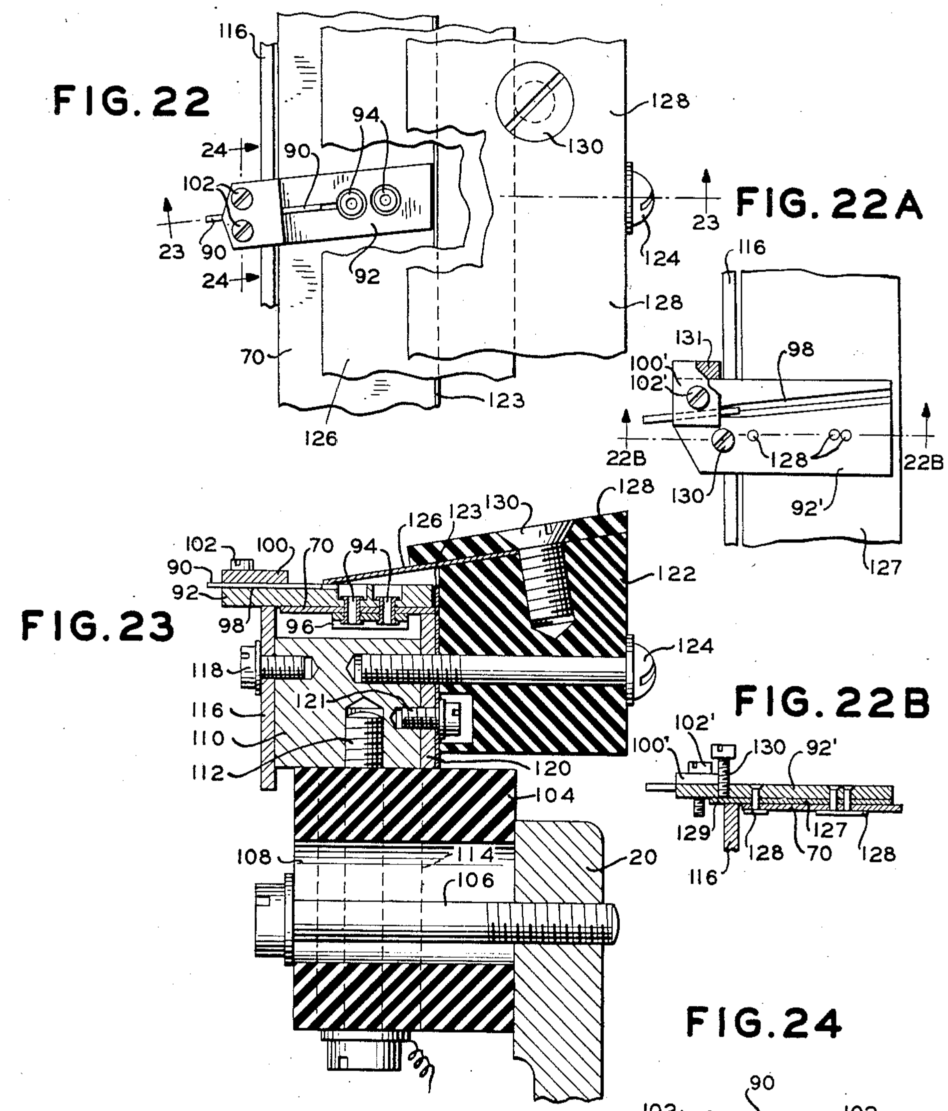
Figure 24:
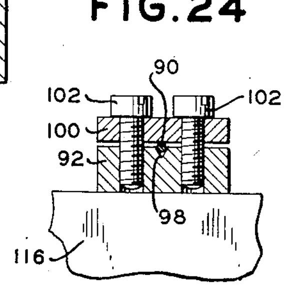
Figure 24A:
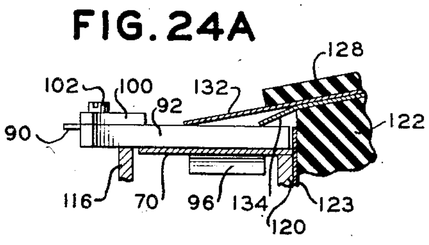
Figures 25, 26, 27, 28:
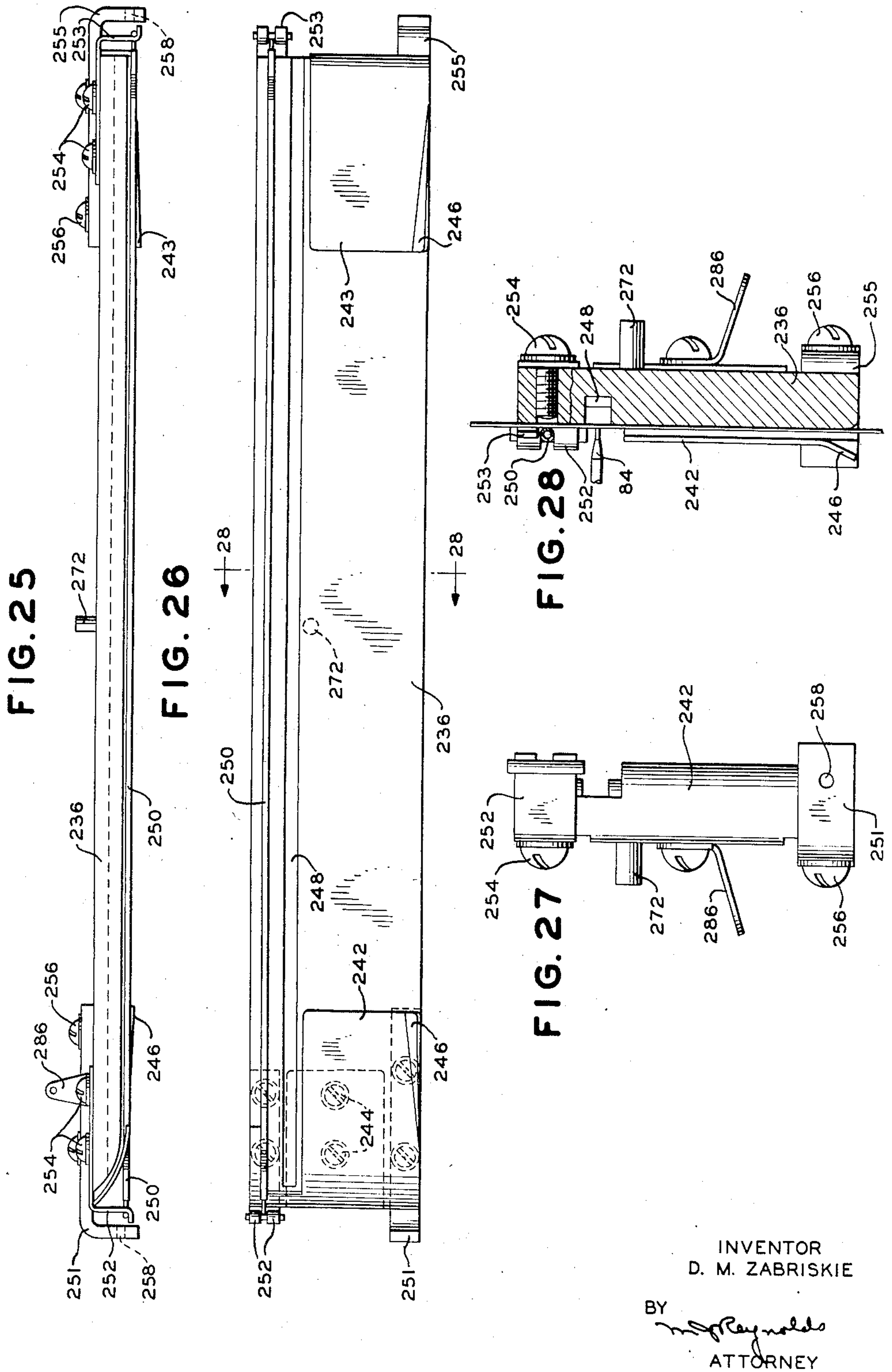
Figure 29:
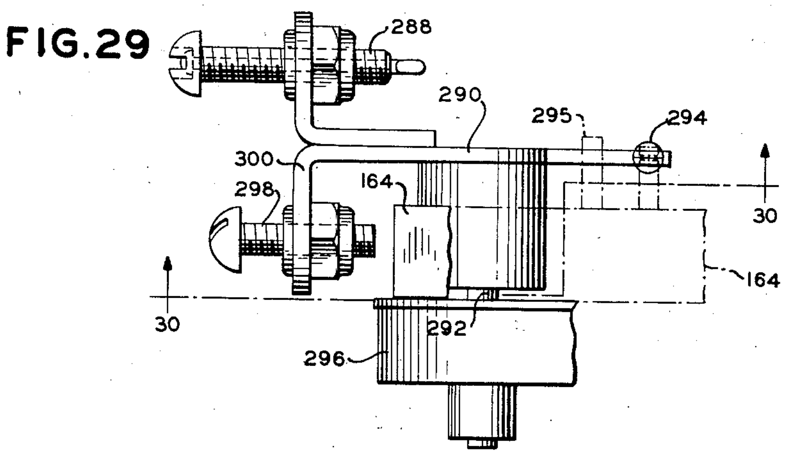
Figure 30:
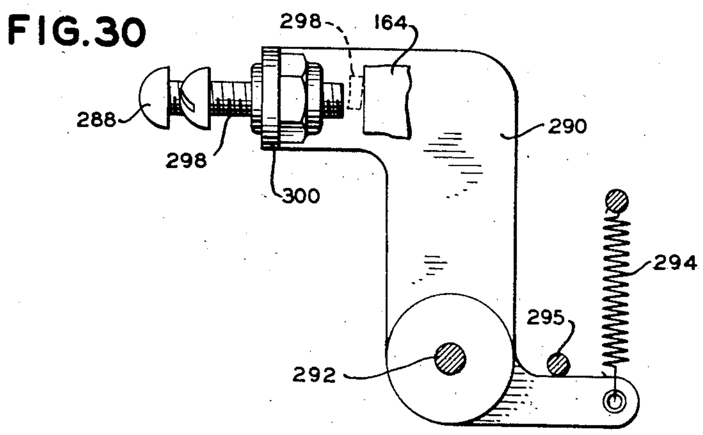
Figure 31:
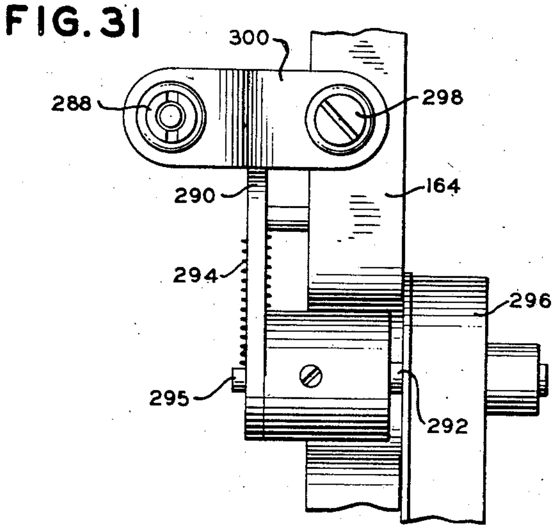
Figure 32:
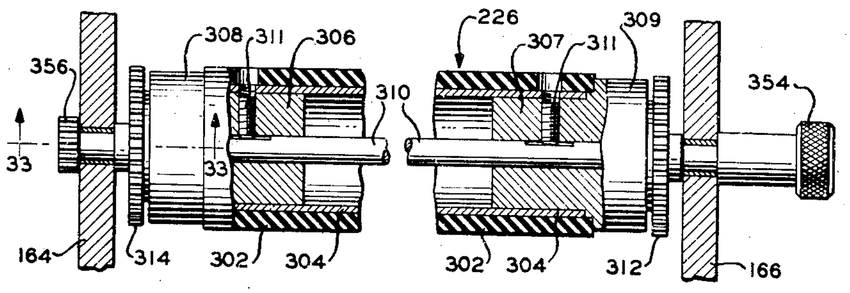
Figure 35:
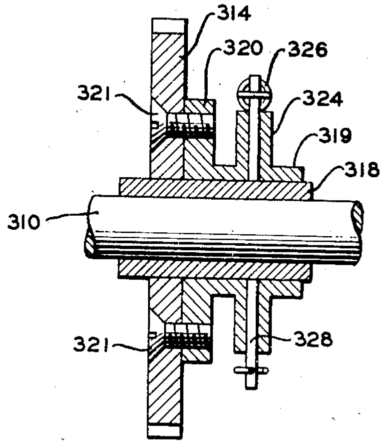
Figure 34:
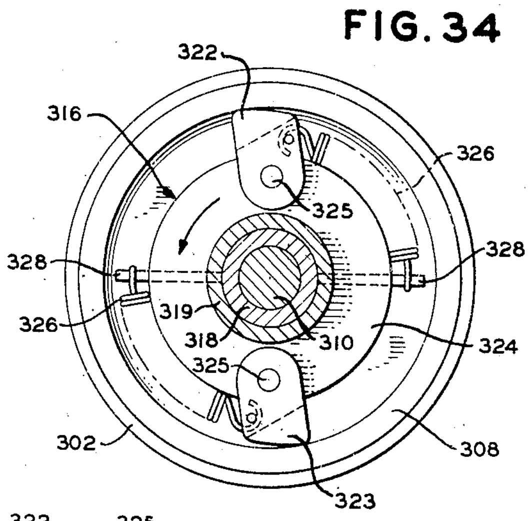
Figure 33:
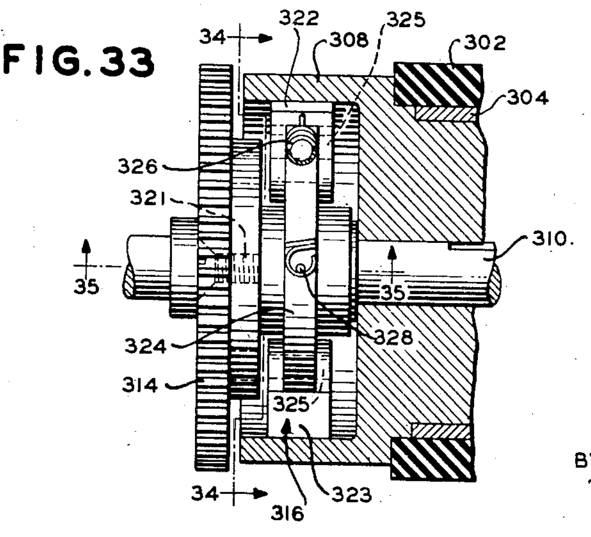
Figures 36, 37, 38, 39, 40:
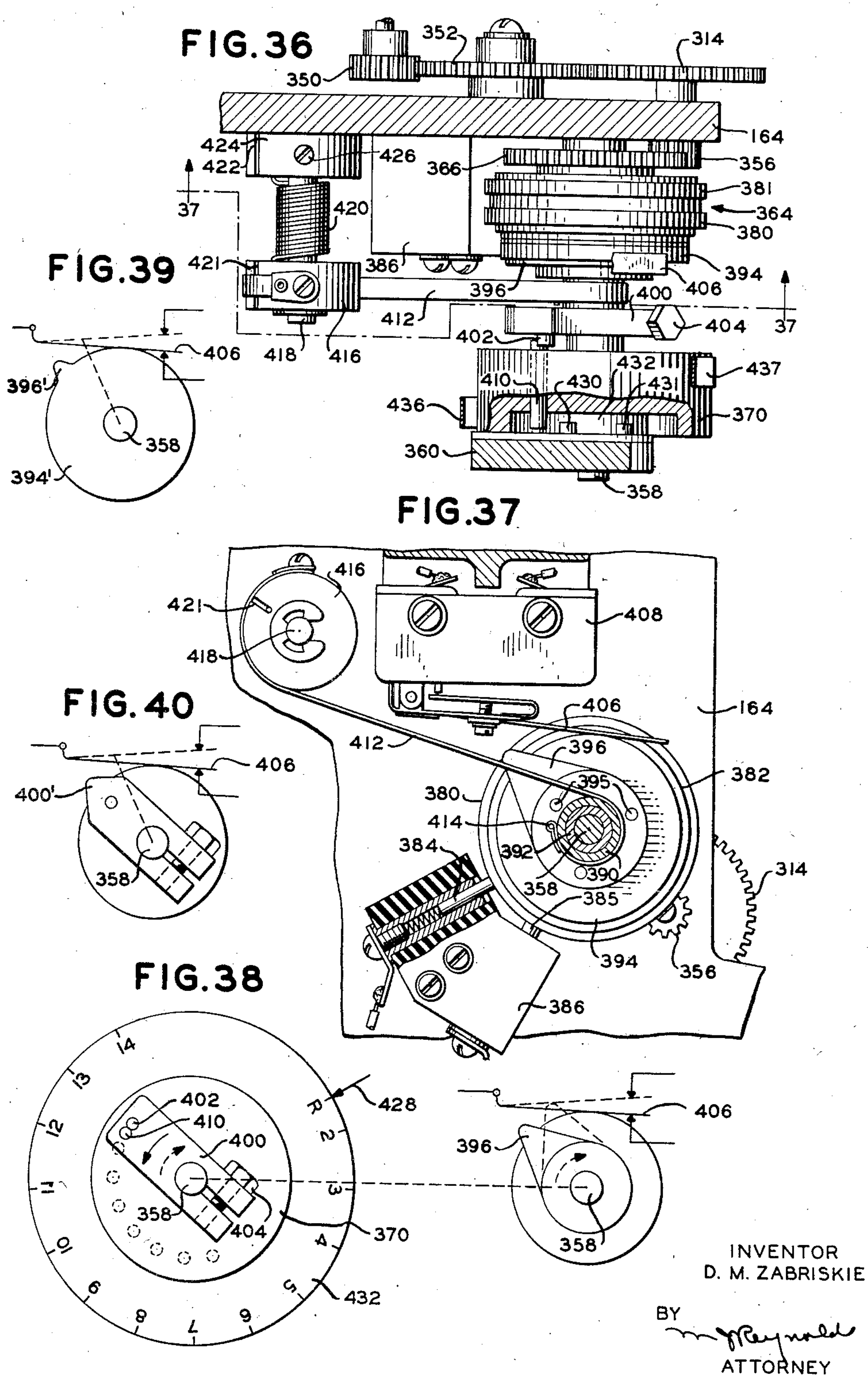
Figure 41:
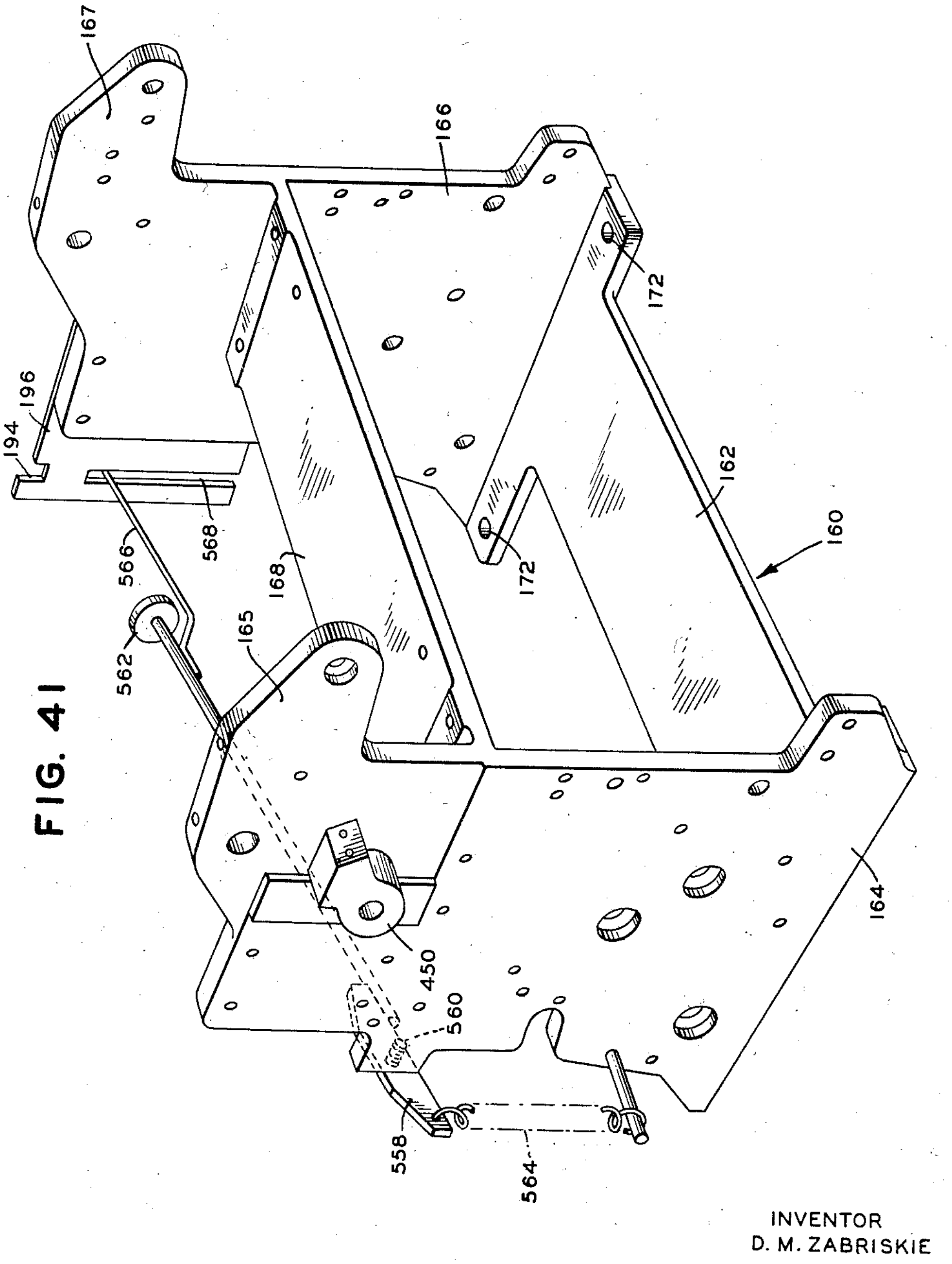
Figure 42:
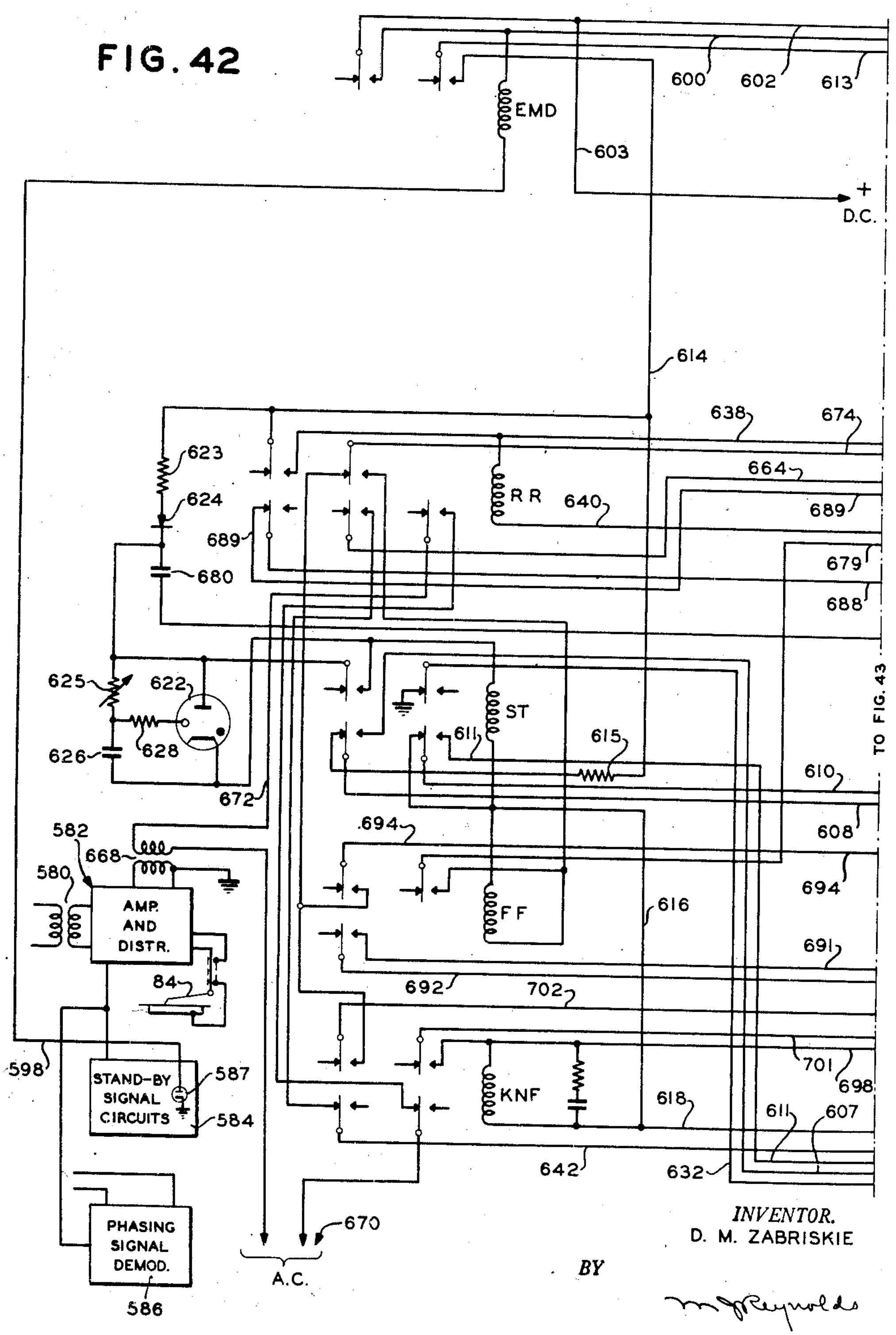
Figure 43:
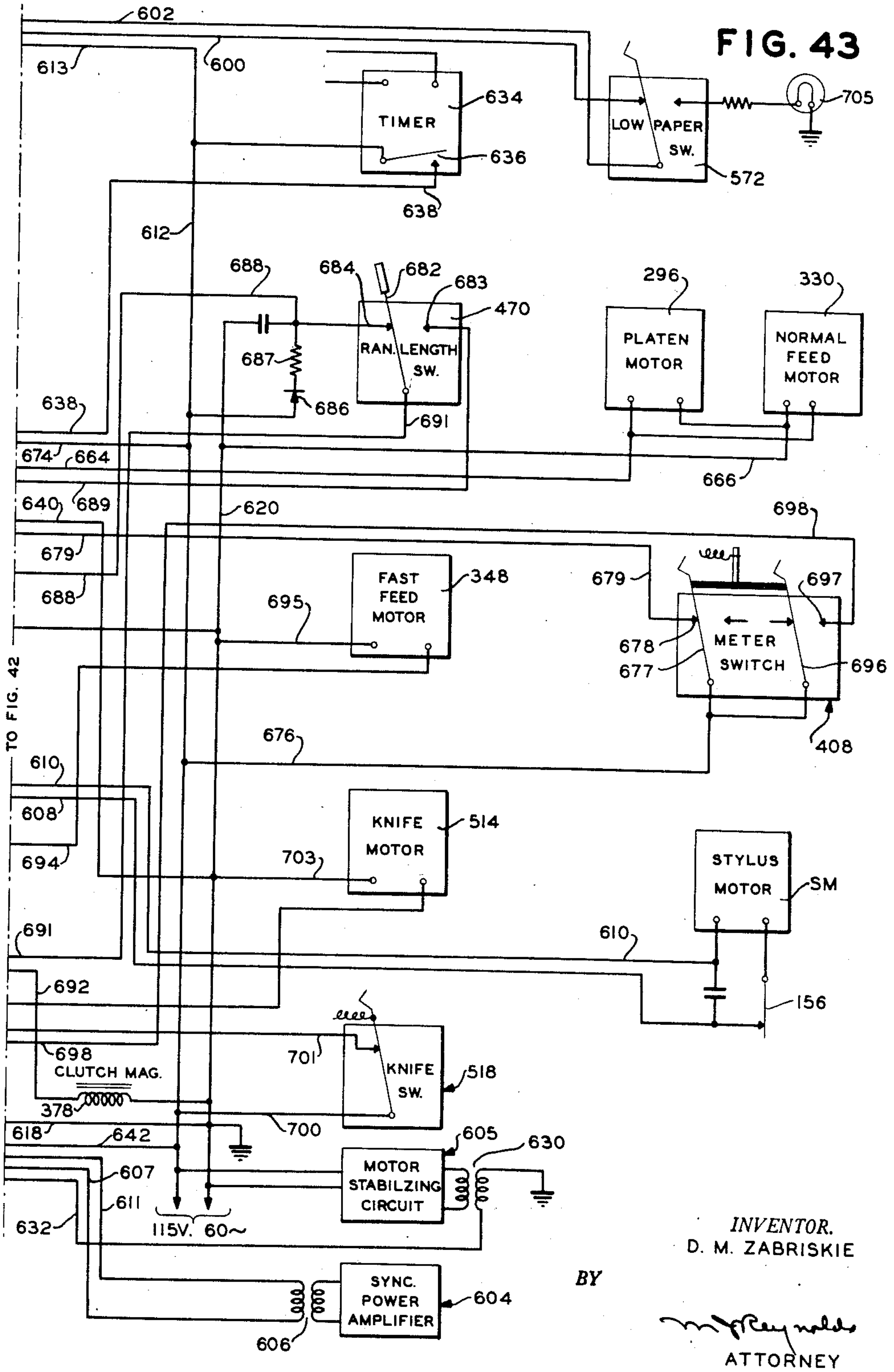

Figs. 2 and 3 together present a top view of the machine, these figures joining on line A—A;

Fig. 2A is a section on line 2A—2A of Fig. 2;

Figs. 4–5, which join on line B—B, together illustrate a front view of the machine with the stylus driving mechanism removed;

Fig. 6 shows the right end of the machine;

Fig. 7 is a view of the left end of the machine;

Fig. 8 shows a front view of the left side of the machine, partly in section and on line 8—8 of Fig. 7;

Fig. 9 represents a cross section on line 9—9 of Fig. 4;

Fig. 10 is a plan view of the stylus drive mechanism;

Fig. 11 is a front view of Fig. 10;

Fig. 12 is a rear view of Fig. 10;

Figs. 13, 14 and 15 show details on section lines 13—13, 14—14 and 15—15, respectively, of Fig. 12;

Fig. 16 is a right end view of Fig. 10;

Fig. 17 is a left end view of Fig. 10;

Fig. 18 shows an enlarged section on line 18—18 of Fig. 10;

Fig. 19 is an enlarged section on line 19—19 of Fig. 10;

Fig. 20 is a section on line 20—20 of Fig. 18;

Fig. 21 presents a schematic illustration of the stylus belt and platen arrangement as compared with prior practice in low-speed recorders;

Fig. 22 is an enlarged plan view of a modified form of stylus mounting on the belt;

Fig. 22A is a plan view of a further modified form of stylus mounting on the belt;

Fig. 22B is a vertical section on line 22B—22B of Fig. 22A;

Fig. 23 is a vertical section on line 23—23 of Fig. 22;

Fig. 24 shows a section on line 24—24 of Fig. 22;

Fig. 24A shows a modification of the stylus belt pressure spring arrangement;

Fig. 25 is a top view of the platen which holds the sheets for recording;

Fig. 26 is a front face view of the platen;

Fig. 27 is an enlarged view of the left end of the platen;

Fig. 28 is an enlarged section on line 28—28 of Fig. 26;

Fig. 29 shows a detail of the platen retractor in a top view;

Fig. 30 is a side view of Fig. 29, sectioned on line 30—30;

Fig. 31 is a rear view of Fig. 29 looking from left to right;

Fig. 32 shows the paper feed roller in longitudinal section;

Fig. 33 is an enlarged section on line 33—33 of Fig. 32;

Fig. 34 is a cross-section on line 34—34 of Fig. 33;

Fig. 35 is an axial section on line 35—35 of Fig. 33;

Fig. 36 represents a plan view of a portion of the paper metering mechanism at the left end of the machine;

Fig. 37 is a cross-section on line 37—37 of Fig. 36;

Fig. 38 is a schematic view to explain the operation of the metering machine;

Figs. 39 and 40 show modified forms of switch actuating means associated with the metering mechanism;

Fig. 41 is a perspective of the main supporting frame in the machine and low paper detector; and Figs. 42 and 43 constitute a diagram of the local control circuits for the machine.

The recorder of this invention comprises two major components: a stylus drive mechanism and a paper feed mechanism mounted on a common base 10 which is shown here as a hollow aluminum casting with a raised front platform 12 and a flat rear extension 14 (Figs. 12 and 17). The stylus drive mechanism is mounted as a removable unit on the raised platform 12, and the paper feed mechanism is permanently mounted on the rear extension 14 of the base casting (Figs. 2 and 3). It will facilitate an orderly description of the machine if we take up the stylus drive mechanism first.

*The stylus drive mechanism (Figs. 10–24)*

The parts that make up the stylus drive unit mechanism are mounted on an angle frame 16 (Figs. 16 and 17), which is a one-piece casting (as of aluminum) comprising a horizontal plate 18 and a vertical wall 20. The frame 16 is adjustably mounted on the raised platform 12 of the main base by screws 22 and 24 which pass through the plate 18 into the base. The right screw 22 (Figs. 3 and 16) forms a pivot for the frame 16 and the left screw 24 (Figs. 2 and 17) has sufficient clearance in plate 18 to permit the required adjustment of the stylus drive unit in the correct recording position, as will appear later.

The swivel adjustment of the frame 16 may be effected in any practical way, as by a screw 26 threaded into a rib 28 of plate 18 (Fig. 17). A collar 30 on screw 26 moves in fixed slotted block 32 on the base platform 12 to prevent axial movement of the adjusting screw. After pivotal adjustment of the frame 16, the screw 26 is locked in adjusted position by a set screw 34.

A synchronous motor SM is attached to the front of upright wall 20 of frame 16 by means of an adapter plate 36 secured to the motor and screws 38. A block 40 may be interposed to let the weight of the motor rest on the base plate 18 of frame 16. The rear end of the motor shaft 42 extends through a horizontal slot 44 in the upright plate 20 (Figs. 13 and 16), and this end of the shaft carries a sprocket wheel or pulley 46 which is fixed to the shaft by a pin 48. As seen in Fig. 13, the outer ring of the pulley 46 is of metal and is insulated by a non-conducting bushing 50. A spring-pressed brush 51 (Fig. 14) provides a definite ground between the drive shaft 42 and the metal frame of the machine. The open slot 44 permits the removal of motor SM and the attached drive pulley 46 without disturbing any other part of the stylus drive mechanism.

A similar metal pulley 52 is mounted by means of a non-conducting bushing 53, as an idler on a stub shaft 54 carried by a bracket 56 (Figs. 11 and 15) which is secured to the front face of the upright plate 20 by screws 58, the plate 20 being cut away at 60 for the passage of shaft 54. The screws 58 go through slots 62 in bracket 56 to permit lateral adjustment of the idler pulley 52. Axial adjustment of pulley 52 on bracket 56 is permitted by a slot or groove 64 in shaft 54 and a set screw 66 (Fig. 15).

The sprocket pulleys 46 and 52 are arranged in horizontal alignment and support an endless belt 70 which in this instance consists of a thin flexible steel band. The belt is provided with holes which are accurately spaced to engage the sprocket pins of the pulleys. The lateral adjustment of the idler pulley permits mounting or removal of the belt 70 and tightening of it to the required extent.

The belt 70 carries a number of stylus units (in this case four) equally spaced and rigidly fastened to the belt. One form of stylus unit is shown in Figs. 18–20, and another form appears in Figs. 22–24. Either form of stylus unit comprises a holder permanently secured on top of the belt and a stylus element removably inserted in the holder. I shall now describe these stylus units in detail.

Referring to Figs. 18–20, a small metal block or plate 72 is fixed on the outer face of belt 70 by any practical means, such as eyelet rivets 74 and a washer 76, which preferably is bent at the ends to facilitate bending of the belt around the pulleys. As shown in Fig. 12, the pulley rims are formed with cut-outs or recesses 78 to accommodate the washers 76. A stylus holder 80 is fixed at a trailing angle on top of block 72 in any suitable way, as by soldering. The holder 80 has a head 82 with a hole for receiving a stylus 84, which is clamped in place by a set screw 86. A groove 88 in the top of holder 80 (Fig. 20) receives the stylus and helps to keep it firmly at the proper trailing angle. The stylus 84 is a piece of stiff wire (usually tungsten) with the tip ground down to shape. This kind of rigid stylus is known as a ground stylus as distinguished from a wire stylus like that shown at 90 in Figs. 22–24, to which I shall now refer.

The wire stylus 90 is mounted in a holder 92 which is secured to the top or outer face of belt 70 by a pair of rivets 94 and a washer 96 like the stylus holder 80 in Figs. 18–20. The stylus holder 92 has a V-shaped groove 98 in which the wire stylus 90 is placed and clamped down by a block 100 and a pair of cap screws 102. When these screws are tightened, the stylus 90 is wedged or squeezed tightly in the V-groove 98, which is slanted crosswise of the belt (Fig. 22) to hold the stylus firmly in trailing position.

In the present machine I use the upper run of the belt 70 for scanning, and the belt must therefore be properly supported and guided so that its upper run moves in a perfectly straight line over the required distance. This supporting and guiding structure for the belt is best shown in Figs. 12, 18 and 23.

To the rear face of the upright wall 20 of angle frame 16 is secured a rectangular piece or beam 104 of insulating material, such as Bakelite, by screws 106. These screws pass through vertical slots 108 in the block (Figs. 12 and 18) to permit adjustment thereof to the correct height. The insulating block 104 extends between the pulleys (Fig. 12) in line therewith and supports a heavy steel bar 110 which is mounted on the block by screws 112. The block 104 has transverse slots 114 (Fig. 10) for the screws 112, so that the bar 110 can be adjusted laterally on the block.

To the rear side of bar 110 is fastened a steel rail 116 by screws 118, and to the front side of that bar is attached another steel rail 120 by screws 121, an insulating piece 122 being also secured to bar 110 by means of long screws 124 passing through clearance holes in the rail 120. Thus the piece 122 may be removed without disturbing the guide rail 120. As seen in Figs. 18 and 23, the top edge of the rail 120 engages the front underside of the stylus belt 70 in its upper run, and this rail is the only guiding member directly in contact with the underface of the belt, which therefore moves with minimum friction. A hard steel wearing piece 123 is inserted between the outer face of the rail 120 and insulating piece 122 to guide the edge of belt 70 and prevent the wearing of a groove in the insulating member. The steel rail 116 does not touch the belt and is so arranged that its top edge engages the underside of the ground styluses 84 (Fig. 18) or the underside of the wire stylus holders 92 (Fig. 23). In either case, the fixed rail 116 compels the scanning styluses to travel in a straight line without deviation thereby preventing uneven spacing or grouping of the recording lines. For this reason the guide rail 116 is called the anti-grouping bar. The ends of this bar are curved at 117 (Fig. 12) to guide the styluses on and off the bar by an easy movement.

It should be stated here that the feature of the anti-grouping bar 116 is claimed broadly in the pending application of Hallden and Zabriskie, Ser. No. 83,333, filed March 25, 1949, for "Multi-Stylus Facsimile Machine."

The insulating block 122 carries a leaf spring 126 (Figs. 18 and 23) in the form of a thin flexible band held in place by an insulating strip 128 which is fastened to the top of the block by screws 130. The leaf spring 126 extends parallel to the belt 70 along its upper run and is in uniform pressure contact with the stylus units during their scanning movements. In Fig. 18 the spring 126 bears directly on the ground styluses 84, and in Fig. 23 the spring engages the stylus holders 92. In either case the flexible leaf spring 126 exerts a uniform light pressure downward on each stylus unit to hold the same firmly against the anti-grouping bar 116 and the rail 120. As a result the fast moving stylus points are guided unerringly through the same straight path for line-by-line scanning.

As will be clear from Figs. 18 and 23, the contact point of spring 126 on the stylus units is somewhere between the fixed guide rails 116 and 120, so that the upper run of the belt 70 is firmly supported and guided by the rails along its front and rear edges. That is to say, the front edge of the belt is supported directly by the rail 120, and the stylus units, which in effect are rigid structural parts of the belt and rest on the anti-grouping bar 116, form a supporting connection for the rear edge of the belt. In this way the upper run of the stylus belt is supported along both edges, although it actually engages only the front rail 120. The practical advantage is twofold: The spring 126 keeps the stylus units in uniform pressure contact with the anti-grouping bar 116 without distortion of the belt; second, the belt is able to operate with minimum friction even at high speed and thereby prevents overloading of motor SM.

In Figs. 22A and 22B *I* have shown a modified stylus mounting for the belt 70 which differs primarily from the form shown in Figs. 22–24 by including a thin steel spring member 127 between the stylus holder 92′ and the belt 70, the member 127 being welded to the holder 92′ and belt 70 by the studs 128. One end 129 of the member 127 extends beyond the face of the belt and is engageable by a screw 130 threaded in the holder 92′, whereby each of the styli 90 may be adjusted vertically to cause all styli to travel in the same horizontal trace. This is desirable to compensate for any variation in thickness of the holder 92′ or in the depth of the stylus groove 98′. After adjustment the screw 130 is locked in place in any desired manner, as by cementing or soldering. The stylus clamping plate 100′ only partially covers the stylus holder 92′ to provide room for the adjusting screw 130, and is provided with a guide flange 131 extending downwardly along one edge of the holder 92′ thereby permitting the clamping plate to be held in place by a single screw 102′.

The groove 98′ beneath the plate 100′ is of such size as to enable good clamping action of plate 100′ to be obtained, this groove, outwardly beyond the clamping plate, diverging into a wider guide section for readily retaining a new stylus and guiding the same into position beneath the clamping plate.

Instead of a single leaf spring 126 I may in some cases employ a double leaf spring, as shown in Fig. 24A, where two spring blades 132 and 134 are mounted on the block 122. The longer spring 132 engages the stylus holder 92 near the anti-grouping bar 116, and the shorter spring 134 bears down on the stylus holder near the guide rail 120. This double-spring arrangement provides two spaced points of contact on the stylus holders for a more uniform distribution of the downward pressure that holds the belt 70 in guiding contact with the rails 116 and 120.

It is important to observe at this point that the upper or scanning run of the stylus belt 70 is supported by the rails 116 and 120 in a line slightly above the tangential line of the pulleys 46 and 52. Referring to the schematic illustration in Fig. 21, the tangential line of the pulleys is indicated at 136 and the upper run of belt 70 is supported a little higher. This novel arrangement of the belt, slight as it may appear, has important practical advantages in this high-speed recorder, as will be understood from the following considerations.

In low-speed recorders of the multi-stylus type, it has been the standard practice to support the scanning run of the belt (whether upper or lower) in the tangential line of the pulleys, as indicated by the conventional belt and pulley assembly AB in Fig. 21. Since the belt in those machines was driven at comparatively low speed (180 lines a minute), that arrangement was entirely satisfactory because the belt could be guided to move along a straight line approximately tangential with the pulleys without excessive frictional losses due to the belt guiding elements.

However, at the high belt speed required in this new recorder, where the scanning speed is 1800 lines a minute, the behavior of the belt made it impractical to use the old arrangement. Attempts to force the upper run of the belt into a straight path 136 tangential to the pulleys not only overloaded the motor by the excessive friction resulting from the belt guiding elements, but the steel belt itself was subjected to such strains that it would break in a short time.

I overcame these obstacles by raising the upper run of the belt above the tangential pulley line 136, thereby allowing the belt to follow the natural curvature of its path due to centrifugal force on leaving and approaching the pulleys. It is to be understood in Fig. 21 that the curvature of the belt as it flies out naturally at the pulleys is represented at 70a (exaggerated for illustration). It is to be further understood that the belt straightens out at the point 70b and continues in this straight path (due to the guide rails 116 and 120) to the point 70c, where the guide-free belt approaches the pulley 46 in the natural curvature produced by the centrifugal force.

It will thus be clear that by placing the upper run of the belt 70 above the tangential pulley line, I allow the belt to follow a natural path, thereby reducing frictional losses to such an extent that a small synchronous motor can drive the belt at high linear speed. Further, by causing the belt to follow a natural line of travel, excessive strains in the belt are avoided and its life is greatly prolonged. These practical advantages of my novel belt arrangement have been demonstrated by actual performance of the machine under commercial conditions.

The supporting frame 16 of the stylus drive mechanism also carries a stylus setting gauge as a permanent structural part thereof. This gauge is shown in Figs. 10, 12, 16 and 17, to which reference will now be had. The upright wall 29 at the left of casting 16 (Fig. 10) has an extension or bracket 138 which is slotted and supports a lever 140 on a pivot pin 142. A rod 144 is pivoted at its rear end to the lever 140 by a pin 146 and the front end of the rod carries a knurled nut 148 threaded thereon. An expanding coil spring 150 mounted on rod 144 always tends to rock the lever 140 rearward.

The upper end of lever 140 is bent laterally and carries an anvil 152 which is axially adjustable to and held in the required position by a set screw threaded in the opening 153. The anvil 152 is located in line with the stylus points in their holders on the belt and therefore determines the depth to which a stylus is inserted in its holder. The operation of the stylus gauge is as follows:

The knurled nut 148 is turned to move the pivotable lever 140 forward until it strikes the shoulder 154 (Fig. 17) of the bracket 138. During this movement the lower end of lever 140 releases a normally closed switch 156 in the motor circuit, thus preventing accidental starting of the motor during the adjusting operation. The belt 70 is turned by hand (as permitted by the motor SM) until the stylus to be inserted is in line with the gauge anvil 152. The stylus is then moved rearward until its point is stopped by the anvil. This adjustment will be made when a new belt is placed on the pulleys 46 and 52, when new styluses are inserted in their holders or to compensate for wear. The average life of a group of tungsten styli before readjustment will be required is approximately eight hours of continuous operation. This corresponds to about 110 miles of travel over the recording sheet. Longer operation may be obtained but with some degradation of the recorded copy.

The manner of phasing the stylus belt with the incoming signals is disclosed and claimed in the copending application of Diebert et al., Serial No. 261,462, filed December 13, 1951, and entitled "Facsimile Receiving Apparatus"; and the manner of regulating the speed of the stylus belt motor SM is disclosed and claimed in the copending application of Turner et al., Serial No. 245,544, filed September 9, 1951, and entitled "Electric Motor Speed Regulation."

The styluses, as heretofore stated, as they travel from left to right engage the recording paper in succession as the latter is moved continuously upward at a uniform rate. The paper feed mechanism and the associated control and paper severing mechanism will next be described.

*The paper feed mechanism*

The paper feed and associated mechanism is mounted upon the base casting 10 to the rear of the stylus drive mechanism, all of the parts being carried by a frame casting 160 (Fig. 41) having a base 162, spaced side members 164 and 166, and a cross rail or shelf 168. The frame 160 is secured to the flat rear extension 14 of the base 10 by screws 170 (Figs. 4 and 5) engaging in the openings 172 in the base 162 of the frame.

The principal mechanisms mounted upon the frame 160 include the paper supply roll mounting and paper guiding means for directing the recording paper to the recording position; the normal feed mechanism for advancing the paper past the moving stylus at the recording speed, for recording of the message or other transmitted subject matter; the fast feed mechanism for rapidly feeding out unrecorded paper either to provide a uniform margin below the recording or to provide a sheet of selected uniform length, up to a prescribed length, regardless of the length of the recording; the feed meter for accurately measuring either the length of the lower margin or of the total length of the sheet, as desired; the cut-off and delivery mechanism for severing the recorded sheet and delivering it out of the recorder to a suitable receiving receptacle; the platen retracting mechanism for presenting the paper to the path of the recording styluses during the recording period, that is, during the period of normal paper feed, and for retracting it from the path of the styluses during the fast feed and severing operations; and the low paper detector for actuating indictaing and control circuits when the supply roll has been exhausted or is nearing exhaustion.

The paper supply holder consists of a drum 174 (Figs. 3 and 6) mounted at each end on a disc 176 secured to a shaft 178 by a set screw 180. The paper supply consists of a roll of electrosensitive recording paper 181 wound on a cardboard sleeve 182 carried on the drum 174. Lateral movement of the paper roll is prevented by end discs 184 and 186 (Fig. 2), also secured to the shaft 178 by set screws 188 extending through the hubs 190, 191. The right reduced end 192 of shaft 178 rests in a bearing slot 194 in a bracket plate 196 secured to the right end frame member 166 of casting 160 by screws 198, 199. The left reduced end 200 of shaft 178 likewise rests in an open bearing 202 in a bracket 204 (Fig. 7) secured to the left frame member 164. A brake (Figs. 2 and 9) applied to the left hub member 191 consists of a flexible band 206 passing over the hub 191 and having one end anchored to a post 208, carried by frame member 164, and the other end secured to an end of a helical spring 210 affixed at its other end to a frame post 211. The brake prevents overrunning of the drum at the end of a fast feed operation.

The paper web 212 is guided from the rear of the roll 181 through a paper chute comprising two spaced curved guide plates 214 and 216 (Fig. 9) extending from the rear to the front of the paper feed assembly, beneath the frame base member 162. Plate 214 is supported from the side frame members 164 and 166 by screws 218, 219 and angled brackets 220, 221. Plate 216 is supported from the sub-base 14 by rear braces 222 and forward braces 224. The guides 214, 216 terminate adjacent the periphery of a paper feed roller 226 and a spring pressed idler roller 228 by which the paper is fed upwardly between a pair of spaced flat guide plates 230, 232, mounted by means of lugs 234 to the side frame members 164 and 166.

A paper platen 236 is disposed with its forward face in substantial alignment with the opening through the guide plates 230, 232, so that the paper passes upwardly thereacross past the recording position and thence forward of a deflecting plate 237 carried by the rail 168 and thence upwardly across a web supporting plate 238 mounted by screws 240 on the top of the frame side members 164 and 166.

As shown in Figs. 25 to 28, the platen 236 consists of a solid bar, preferably of magnesium to give it the desired low inertia. It is sufficiently thick to be inflexible so that, when properly adjusted, it will remain parallel to the stylus path throughout its entire length. It extends across the front of the recorder and is provided with two paper guides 242, 243 in the form of U-shaped plates disposed at the opposite ends thereof and secured to the rear of the bar by screws 244. The guides 242, 243 extend around each end of the platen bar with the front faces thereof spaced slightly away from the bar. The lower corners 246 are bent outwardly to give a slight flare to the opening of the slot formed between the guides and the platen bar. It will be noted that the left end of the platen is curved rearwardly from the face of the platen and the left guide plate 242 is correspondingly curved in such manner as to curve the left edge of the paper back of the plane of the platen face. It will be further observed that the straight run of the stylus is longer than the width of the platen and of the recording paper, and extends outwardly beyond each end of the platen. By virtue of this arrangement the entering stylus engages the paper gradually at the left curved end thereof and continues its straight movement for a slight distance beyond the right edge of the paper before it starts to depart from its straight line movement, thereby preventing injury to the paper and providing a smooth scanning movement of the styluses across the flat sheet. Immediately above the top edge of the guides 242, 243, the bar 236 is provided with a horizontally extending groove 248, in alignment with the path of the styluses, such as 84. The groove 248 prevents the accumulation of soot on the platen at the recording position, due to action of the styluses on the paper and also provides a degree of resilience to the paper which reduces shock and consequently bounce. The springback effect of this resilience is also important in aiding the pressure spring 270, to be described, in producing a rapid follow of the paper. Above the groove 248 the platen has a paper pressure member in the form of a flexible helically wound spring 250 tightly stretched across the face of the bar and secured at either end in bifurcated brackets 252, 253, secured by screws 254 to the rear of the platen bar and extending across the ends thereof into alignment with the face of the bar. The spring 250 holds the paper in firm contact with the face of the platen closely adjacent the recording path, thus insuring good electrical contact between the platen and the rear of the electrosensitive sheet, and proper positioning of the face of the sheet in the plane of travel of the styluses.

The platen is mounted on the machine by means of bearing brackets 251, 255 disposed at each end thereof and secured to the lower rear ends of the bar 236 by screws 256. The bearing brackets are bent forwardly at their outer ends and are apertured at 258 at a point only slightly to the rear of the front face of the platen. The bearing openings 258 receive the platen pivots 260, 261 (Figs. 4 and 5) formed as a reduced end on the rods 262, 263 adjustably secured in brackets 264, 265 by set screws 266. The brackets 264, 265 are mounted on the side frames 164, 166, respectively, by screws 268 extending through adjustment slots in the bracket side pieces. This adjustment provides means for positioning the plane of the platen and, consequently, of the paper in proper relationship to the plane of the path of the stylus tips. A further refinement of this relationship is provided, as heretofore described, by the adjustment screw 26 for adjusting the stylus driving mechanism to or from the plane of the paper. The comparatively short pivotal radius of the platen inherent in the described construction prevents twisting of the platen about its pivots and provides a stable, bounceless action unattainable with previous forms of platen mounting.

The platen is normally urged under yieldable pressure into its forward or recording position by a leaf spring 270 (Fig. 6), engaging a pin 272 carried intermediate the ends of the rear face of the platen. The spring 270 is anchored to a block 272 secured by a screw 274 to a rod 275 extending between the frame side members 164 and 166. The left end of the rod 275 passes through and is secured to a lever 276 biased in a clockwise direction (as seen in Fig. 9) by a helical spring 278. The upper end of the lever extends forwardly and leftward at 280 and the extended end has a stop screw 282 (Fig. 7) adjustable thereon and arranged to engage the left frame member 164 to determine the angular position of lever 276 and through it the tension applied to the platen by the spring 270.

Retraction of the platen out of the path of the styluses is effected by a flexible wire 284 (Fig. 9) secured to a lug 286 carried by the rear face of the platen. The cord 284 at its opposite end is secured to an adjustable screw 288 carried by one arm of a lever 290 secured to a shaft 292. The lever and shaft are biased clockwise, as seen in Fig. 9, by a spring 294 against a stop pin 295 carried by the side frame member 164. The shaft 292 is the shaft of a 1 R. P. M. clutched motor 296 (Figs. 7 and 29 to 31), adapted when energized to rock the lever 290 against the bias of spring 294 to ease the strain on the cord 284 and permit the platen, under pressure of its spring 270, to move into the path of the stylus. Movement of lever 290 under action of the clock motor is limited by an adjustable stop screw 298 carried by lever arm extension 300 and movable into engagement with a rear surface of the left frame member 164. Upon such engagement the motor 296 stalls. It will be noted from the foregoing that with motor 296 deenergized, spring 294 overcomes the bias of the platen pressure spring and motor clutch to retract the platen from its recording position, and during operation of the motor the platen is permitted to advance into recording position. In the operation of the machine, as will subsequently appear, motor 296 is energized only during the recording period and hence the platen at all other times is in retracted position.

The paper is advanced across the face of the platen by the feed roller 226, the construction of which is best seen in Figs. 32 to 35. The outer rubber cylinder 302 is mounted on a seamless steel tube 304 carried by end hub members 306, 307, each having an outwardly extending flange 308, 309, respectively, forming housings for one-way clutches. The hubs 306, 307 are secured to the drive roller shaft 310 by set screws 311.

The feed roll 226 is driven at normal recording speed, for instance, one-quarter inch per second, by a normal feed motor and a gear train including the gear 312 and the one-way clutch contained within the housing 309. The feed roll may also be driven at a high speed, in the present embodiment at 26 feet per minute, by a fast feed motor through a gear train including the gear 314 and a one-way clutch 316 (Fig. 33) contained within the housing 308. The one-way clutches disposed in the housings 308 and 309 are identical. Each comprises a bearing sleeve 318 freely rotatable on shaft 310 to which the double flanged clutch hub 319 is attached. The drive gear 314 is secured to one flange 320 of the hub by screws 321. A pair of U-shaped clutch struts 322, 323 straddle the hub flange 324 and are pivoted thereto by pins 325 being biased by springs 326 in a direction contra to the direction of rotation of the hub 319 and into contact with the inner surface of the housing 308. The springs 326 are anchored to posts 328 carried by hub flange 324. Consequently movement of the hub 316 in a counterclockwise direction as seen in Fig. 34, that is, in the direction of the motor drive, causes the clutch struts 322, 323 to engage the flange of the housing to drive the feed roll, whereas movement of the feed roll in the same direction under the force of the other driving motor rocks the struts out of gripping engagement with the flange and permits the feed roll to rotate freely and independently of the clutch. Since such a one-way clutch is interposed between the feed roll and both the normal and fast feed motors, either motor may drive the feed roll independently of the other.

The normal recording movement of the paper is effected by the normal feed, dynamically braked, synchronous motor 330 (Fig. 6) which, in the example given, operates at 6 R. P. M. Motor 330 is mounted on the inside of the right frame member 166 by screws 332, 333 and carries on its shaft a pinion 334 meshing with an idler gear 336 on a stud 337 carried by the frame side member 166. Gear 336 engages the feed roll drive gear 312 to drive the feed roll through the right hand one-way clutch at 3 R. P. M. thereby to advance the paper at, by way of example, one-quarter inch per second. Obviously other motor speeds, gear ratios and feed roller rates may be employed.

The pressure roller 228 by which the paper web is held against the feed roller 226 is mounted on a shaft 338 (Figs. 4, 5, 6, 7 and 9), bearing at each end of the machine in a slot 340, 341 in adjustable plates 342, 343, respectively, secured to the frame side members 164 and 166, respectively. The pressure roller is pressed against the feed roller by springs 344, 345 extending between the shaft ends and pins 346, 347 carried by the side frame members.

The fast feed motor 348 for rapidly feeding the paper from the recording to the cutting position is mounted on the inside of the left frame member 164 (Fig. 9) in a manner similar to motor 330 and drives the feed roll through the gears 350, 352 and 314, and one-way clutch 316. Motor 348 may, by way of example, be a dynamically braked induction motor operating at 187.5 R. P. M. through a gear train having a 1–3 ratio, thereby advancing the paper at a rate of approximately 26 feet per minute or 5 inches per second.

The one-way clutches provided at each end of the feed roll permit the drive of the feed roll to be taken over instantly by the fast feed motor even before the normal feed drive has stopped. They also permit either motor to drive the feed roll without imparting motion to the gear train and armature of the other motor and further permit the feed roll to be manually rotated to feed out paper without affecting the gear train of either motor. For this latter purpose the shaft 310 at its right end extends outside of the side frame member 166 where it is provided with a hand wheel 354 (Figs. 6 and 32).

*Paper metering mechanism*

The left end of the feed wheel shaft also extends outwardly beyond the frame side member 164 where it is provided with a pinion 356 keyed thereto. The pinion 356 drives a paper metering device for determining either the length of the bottom margin of the recorded sheet or the total length thereof. The metering mechanism also initiates the cycle of operation of the severing mechanism for cutting off and delivering the recorded message to its receiving receptacle or basket. This metering mechanism will be described.

The feed meter mechanism is located at the left end of the machine and is shown in Figs. 4, 7, 8 and 36 to 40. It includes a stationary shaft 358 (Fig. 8), mounted between the side frame member 164 and a right angled bracket 360 secured to the side frame by screws 362. The shaft 358 supports a magnetic clutch 364 compounded with a gear 366, a cam and armature assembly 368 and a stop disk 370. The clutch 364 comprises a hub member 372 having a central bearing sleeve 374 rotatable on shaft 358 and a pair of spaced flanges 376, 377 forming an annular groove for reception of the electric coil 378, the terminals of which are connected to two copper rings 380, 381 mounted on an insulating sleeve 382 on the periphery of the hub. A pair of brushes 384, 385 (Fig. 37), carried by the brush holder 386 engage the rings 380, 381, respectively. The gear 366, secured to the hub member 372 by screws 388, engages the pinion 356 on the feed roll shaft so as to drive the clutch hub whenever the feed roller is operated by either the normal or fast feed motor.

The cam and armature assembly 368 comprises an armature hub 390 mounted for rotation on shaft 358, through a bearing sleeve 392. The clutch armature 394 is secured to the hub 390 by screws 395, a switch cam 396 being clamped between the armature and hub. A non-magnetic anti-freeze disk 398 is loosely mounted on the shaft 358 between the armature 394 and the face of the clutch hub 372. A stop arm 400 is clamped to the sleeve portion of the hub 390, as shown in Fig. 36, and carries a stop pin 402. The arm 400 may be oriented and locked in any position on the sleeve by the clamping screw 404 in order to properly adjust the angular relationship between the stop pin 402 and the lobe of cam 396. Cam 396 in one position thereof engages the operating arm 406 of a twin microswitch 408. In its normal position arm 406 rides on the periphery of the clutch armature 394. Obviously the cam 396 could be made integral with the armature 394 and in Fig. 39 the armature 394' is shown provided with an integral lug 396'. Fig. 40 shows a further modification in which the end of the stop arm 400' is shaped and positioned to actuate the switch arm 406. Stop pin 402 of arm 400 moves in a path intercepted by a pin 410 carried by the stop disk 370, the purpose of which will presently appear.

As stated, the clutch hub 372 rotates with the paper feed roll. The cam and armature assembly 368, however, remains stationary with the stop arm pin 402 in engagement with the stop pin 410 except when the magnetic clutch is energized. This occurs either at the start of a recording, when the normal feed motor is energized or at the end of the recording, when the fast feed motor is energized, depending on whether it is desired to feed out a uniform length of paper or a sheet having a predetermined margin below the recording. Upon energization of the magnetic clutch, the cam and armature hub assembly is driven by the feed roll, thus carrying stop pin 402 away from pin 410 until cam 396 actuates the switches 408 to stop the fast feed motor. Upon deenergization of the magnetic clutch, the cam and armature assembly is returned to its normal position by a flexible band 412 which partially encircles a section of the sleeve portion of the cam and armature hub 390 and is anchored at one end to the hub by a pin 414. The opposite end of band 412 is secured to the periphery of a spring pulley 416 rotatably mounted on a stud 418 mounted in the side frame 164. A coiled spring 420 surrounds the stud 418 and is anchored at one end in a slot 421 in the pulley 416 and at the other end in a slot 422 is a spring tension adjusting collar 424 secured to the stud by a set screw 426 (Fig. 36). The rotation of the cam and armature assembly when driven by the feed roll is in a direction (clockwise in Fig. 37) to be opposed by the spring 420 so that upon release of the magnetic clutch, the cam and armature assembly will be returned by the spring to bring the stop pins 402 and 410 back into engagement.

The extent of movement of the cam and armature assembly required to actuate the twin switch 408 is determined by the angular relation between the stop arm pin 402 and the lobe of cam 396 and by the angular position of the stop pin 410. The stop disk 370 which carries pin 410 is adjustable through an angle of 386 degrees in a manner which presently will be described. One extreme position of adjustment, termed the "random length" setting is employed for producing a predetermined margin at the bottom of a recorded sheet. In this setting of the stop disk the magnetic clutch is energized simultaneously with the fast feed motor at the end of a recording and the extent of the paper feed and hence its lower margin is determined by the angular position of stop arm pin 402 relative to the cam 396.

In all other settings of the stop disk 370 the clutch magnet is energized during the operation of both the normal feed and fast feed motors and, with the angular relationship between arm 400 and cam 396 properly established with reference to the clutch 408, the total length of paper delivered is determined by the angular setting of the stop disk 370. The lengths "R," "2," "3," etc. appearing on the disk 370 (Fig. 38) indicate the setting of the disk relative to an index mark 428 for "Random length" and uniform message length in inches, and stop arm 400 is normally adjusted so that with any numeral at the index point, the total length of message advanced by the feed roll before actuation of switch 408 will correspond in inches to such numeral.

The two extreme positions of the stop disk 370 is limited by two pins 430, 431 extending through the bracket 360 into an annular groove 432 in the stop disk and into the path of the stop pin 410 the left end of which protrudes into the groove 432.

Figure 1:
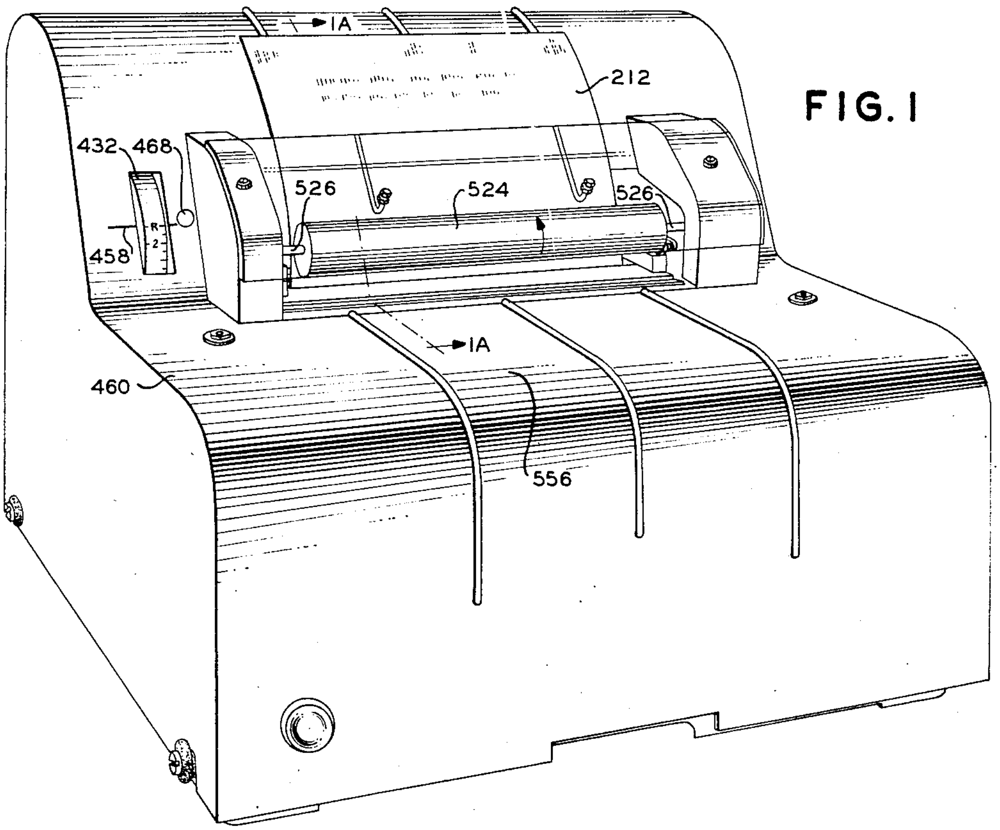
Fig. 1 shows a perspective of my new recorder in commercial form.

For convenience, the stop disk 370 is made adjustable through a hand wheel 432 (Figs. 1, 7, and 8) available through the cover of the machine. This is effected by coupling the disk 370 to the hand wheel through a two piece pulley 434 and two flexible bands 436, 437. The pulley 434 comprises a stepped member 438 secured to a sleeve 440 by a set screw 442, and a ring member 444 adjustably mounted on the member 438 by a screw 446 and slot 447. The sleeve 440 is mounted for rotation on a fixed shaft 448 carried by a boss 450 on the left frame member 164. The coupling band 436 at one end passes partially around the stop disk 370 and is anchored thereto by a screw 452; the opposite end of the band is similarly engaged with and secured to the adjustable pulley ring 444 by a screw 453. The ends of band 437 pass in the opposite direction partially around the disk 370 and pulley member 438, and are secured thereto by screws 454 and 455, respectively. The adjusting slot 447 permits the bands 436, 437 to be tightened so as to provide a back-lash free, positive drive between the pulley 434 and stop disk 370 whereby the latter will accurately follow the movement of the former. The hand wheel 432 is also mounted on and secured to the sleeve 440 by a set screw 456 and may be oriented on the sleeve so that the indicia on the periphery thereof will be correctly positioned relative to an index mark 458 on the machine cover 460 (Fig. 1). The graduated hand wheel 432 and pulley 434 are locked in any desired position by a pair of vise-like grippers 462, 463 (Figs. 2, 2A, and 4) engaging the opposite side of a rim 464 pinned to the sleeve 440 (Fig. 8). Grippers 462, 463 are tightened by a screw 466 threaded into the gripper nut 463 and into the boss 450. A second screw 467 threaded into the boss 450 assists in retaining the gripper members in proper position relative to the rim 464. The screw 466 is available for tightening or loosening through an aperture 468 in the cover 460.

When the hand wheel 432 is set with the indicia R, for "Random length," the metering mechanism serves, as stated, to measure only the lower margin of the recorded blank. For this purpose the magnetic clutch 364 is energized only at the end of the passage through the control circuits to be later described. Included in these control circuits is a switch 470 (Figs. 2, 2A and 7) mounted on the frame member 164 and having an operating lever 474 which extends upwardly into the path of a pin 476 carried by the hand wheel 432 in such position that it is engaged to actuate he switch 470 when the hand wheel is in the "R" position. In all other settings of the hand wheel 432 the switch 470 is unactuated and the clutch magnet is energized by the control circuit at the start of the message to measure a uniform length of message sheet, regardless of the length of message and dependent only on the particular setting of the wheel 432.

The magnetic clutch when operated either with the fast feed motor alone or with both the normal feed and fast feed motors, causes the feed roll to drive the cam 396 into engagement with the operating lever 406 of the twin switch 408 to actuate the plungers 478, 479 thereof. The contacts actuated by these plungers, act through the control circuits of Figs. 42 and 43 to stop the fast feed motor and hence the paper feed, to release the magnetic clutch and to initiate the operation of the paper severing mechanism. This latter mechanism will now be described.

*Paper severing and delivery mechanism*

The cutter mechanism is carried on the frame cross rail or shelf 168. It comprises (Figs. 1A, 2, 3, 8 and 9) a stationary blade 480 rigidly mounted on bars 482, 483 carried by the rail 168. The moving blade 484, which has a cutting edge disposed at an angle (7½° as shown) to the stationary blade, is attached to bars 486, 487 which ride on the bars 482, 483 in a forward and backward direction, being guided by the angles 488, 489. Pressure rollers 490, 491 (Figs. 2, 3 and 9), carried respectively by levers 492, 493, pivoted on screw studs 494, 495 mounted on the angle guide members 488, 489, respectively, are loaded by springs 496, 497 to engage the bars 486, 487 to insure constant contact of the movable blade 484 with the stationary blade 480.

Parallel movement is imparted to the moving blade assembly through racks 489, 499 (Figs. 1 and 9) mounted on the bars 486, 487, respectively, and segments 500, 501 pinned to rocker shaft 502 extending across the top of the paper feed assembly and bearing in the frame side members 164, 166. The shaft 502 outwardly of the frame right side member 166 carries a crank arm 504 (Fig. 6) having a link 506 pivoted at one end to the slotted end 507 thereof, to provide for angular adjustment of the crank arm. The opposite end of link 506 is slotted at 508 and engages a crank pin 509 carried by a sprocket wheel 510 so that upon each revolution of the wheel 510 the movable blade is given a forward cutting stroke and a return stroke. A hand knob 512 (Fig. 5) is mounted on the end of the crank pin 509 to permit the sprocket wheel to be rotated manually, if desired. The wheel 510 is normally driven counterclockwise through one revolution to effect the cutting off function by a motor 514 mounted upon the inside face of frame side member 166 and having a shaft 516 extending therethrough on which the sprocket wheel 510 is carried. Motor 514 is started at the end of a paper blanking or feed-out operation by the actuation of the micro-switch 408, as will more fully appear, and is stopped at the end of one revolution of the sprocket wheel 510 through suitable circuits controlled by a switch 518, the actuating arm 520 of which is engaged by a cam 522 carried by the sprocket wheel.

The normal or home position of the sprocket wheel is shown in Fig. 6. Initial counterclockwise movement of the sprocket wheel operates crank arm 504 and rock shaft 502 in a clockwise direction to drive the movable knife assembly forwardly, i. e., to the left as seen in Fig. 9, through the racks 498, 499 and sectors 500, 501. It will be noted from this figure that the paper web extends upwardly between the fixed blade 480 and movable blade 484 so that the above movement is effective to sever the sheet at the upper face of blade 480.

The recorded message, after severance, is delivered by a delivery roller 524, the shaft 526 of which is mounted in bearings in the forward extensions 165, 167 of the frame side members 164, 166. At its right end, shaft 526 carries a gear 528 (Figs. 5 and 9) which forms part of the gear train comprising the idler gears 530 and 532 and a gear 534 mounted on studs carried by the side frame. Gear 534 has a sprocket wheel 536 incorporated therewith and driven by a chain 538 from the sprocket wheel 510. Consequently, the delivery roller 524 is driven clockwise as seen in Fig. 9 concurrently with the advancement and retraction of the movable blade.

Figure 1A:
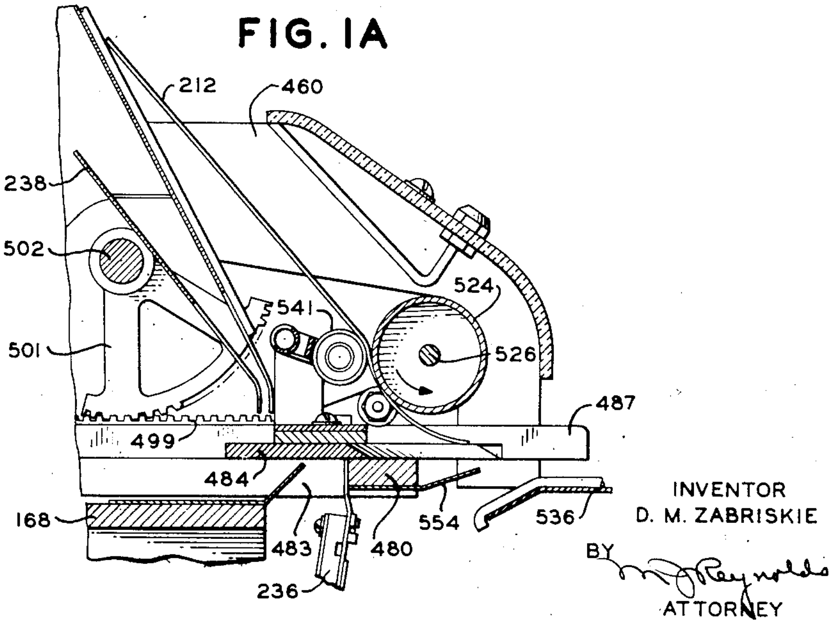
Fig. 1A is an enlarged section on line 1A—1A of Fig. 1 to show certain parts of the cutting and delivery mechanism.

The rear face of the delivery roll is disposed slightly forward of the cutting edge of blade 480 and immediately upon severing of the paper the lower edge of the cut blank is carried into feeding contact with the delivery roll by a pair of spring-loaded pressure rollers 540, 541 (Figs. 1A, 8 and 9). Each of these rollers, such as 540, is carried by a block 542 pivotally mounted by a pin 544 carried by a bracket 546 adjustably secured to a plate 548 mounted on the movable blade 484. The block 542 is biased forwardly by a spring 550 encircling the pivot pin 544 so that the idler rollers exert a yielding pressure on the delivery roll as they force the paper into contact therewith. This occurs as the blade 484 approaches the forward limit of its movement. In order that the pressure rollers 540, 541 will engage the cut sheet for sufficient time to insure that the full length of the message blank will be delivered past the roller 524, a dwell is produced between the end of the forward movement of the blade and the start of its return movement. This dwell is obtained by the slot 508 (Fig. 6) in the lower end of the link 506 and the orientation of the crank arm 504 on the shaft 502 such that the blade will reach its forward position as the crank pin 509 nears its lower dead center position. As indicated in Fig. 9, the period of dwell corresponds to the movement of the pin 509 through the arc shown by the arrow line 552. The slot 508 also permits the motor 514 to start under a no load condition.

Due to the shearing angle of the moving blade 484 the severing action starts at the right edge of the sheet and progresses to the left edge. This tends to skew the sheet slightly, and to overcome this tendency and insure a roller 540 is adjusted to engage the paper slightly in adstraight forward delivery of the sheet the left pressure vance of the right hand roller 541. When thus engaged the cut sheet is straightened and rapidly delivered over the edge of a deflecting plate 554 onto and across the upper ribbed face 556 of the cover 460. Any desired receptacle or basket may be disposed adjacent the cover to receive the recorded blanks as they are ejected from the machine.

At the end of the dwell or paper delivery period, as the crank pin 509 passes beyond the limit of the arc 552, crank arm 504 oscillates in the reverse direction, returning the movable blade assembly to its rear or normal position, the cycle being completed as cam 522 actuates switch 518 to initiate the deenergization of the motor 514.

*Low paper detector*

One feature of the recorder remains for description. This is the low paper detector for indicating when the paper supply 181 has become exhausted or is nearing that condition. Referring to Figs. 7 and 41, a lever 558 is pivoted to a boss on the rear of the frame side member 164 by a bearing stud 560 and carries a roller 562 loosely mounted on its outer end adapted to be urged into contact with the lower face of the paper supply roll by a spring 564. A switch arm extension 566, welded to the lever 558, engages in a guide slot 568 in the paper roll bracket 196 and as the paper supply roll diminishes to a predetermined minimum diameter, the switch rod extension engages the operating lever 570 of a micro-switch 572 (Fig. 6). Switch 572 completes a suitable signaling circuit to operate a low paper indicator thereby to warn the attendant that the supply roll should be renewed. Switch 572, when operated by the lever extension 566, as will later appear, also prevents the starting of a new cycle of recording until the paper supply has been replenished.

*The relay control circuits*

The recorder may be controlled entirely from the distant transmitter and the received signals by which this control is effected consist of a standby signal which for convenience may be a 12.5 kc. tone transmitted during idle periods of the message transmitter, a phasing signal which may be a 25 kc. wave modulated by a 30 cycle rectangular phasing pulse, transmitted for a short period, such as 2.5 seconds preceding the message signals, and the facsimile message comprising a modulated 25 kc. wave. At the end of the message transmission the 12.5 kc. signal is again transmitted and serves as an end-of-message signal. If another message is awaiting transmission, the end-of-message signal may be of very short duration and will be followed again by a phasing signal. Otherwise the end-of-message signal is continued as a standby signal.

If it now be assumed that the standby signal of 12.5 kc. is being transmitted, the platen motor 296, knife motor 514, stylus belt motor SM and the winding 378 of the magnetic clutch 364 will be deenergized. Also the random length message switch 470 will be on either its right or left hand contact, depending upon whether the meter wheel 432 is in its "Random length" position for producing uniform lower margins on the cut sheets or in one of its other positions for producing uniform length sheets. The twin meter switch 408, knife switch 518 and low paper switch 572 will be on their left contacts (Fig. 43).

Referring now to Fig. 41 the incoming signals are applied to the primary winding of an input transformer 580 and comprise the facsimile message signals, a phasing wave and an end-of-message or standby tone. The signals are transmitted from the secondary of transformer 580 to amplifying and distributing circuits indicated by the rectangle 582, by which the facsimile intelligence signals are rectified and applied to the styluses 84. The end-of-message 12.5 cycle tone is distributed to the amplifying and filtering circuit 584 and the phasing wave is distributed to the phasing signal demodulating and amplifying circuits 586. The details of circuits 582, 584 and 586 form in part the subject matter of the aforesaid Diebert et al. application, being shown in Figs. 2 and 3 thereof. They are unnecessary for an understanding of the related operation of the recorder motors and switches. The control circuits for the various motors and the magnetic clutch of the recorder are also fully disclosed in Figs. 6 and 7 of the Diebert et al. application, Figs. 42 and 43 of the present disclosure, with some deletions, corresponding generally thereto. A description of these circuits is necessary for a complete understanding of the operation of the recorder.

An output tube 587 of the standby or end-of-message amplifying and filtering circuits is, in the absence of such signals, strongly conducting, the control grid thereof being biased negatively by the 12.5 kc. signal to materially reduce the anode current flow therethrough. Tube 587 is supplied with a positive anode potential through a circuit extending from the anode of the tube through a conductor 598, the winding of an end-of-message detector relay EMD, conductor 600, the back contact and tongue of the low paper switch 572 (Fig. 43), conductor 602 and conductor 603 to the positive D. C. terminal on Fig. 41. In the absence of a 12.5 kc. signal, the anode current of tube 587 maintains relay EMD energized. However, when a 12.5 kc. tone is received, the current through the tube 587 drops sufficiently to release relay EMD. Through circuit arrangements in the circuit group 580 under control (not shown) of relay EMD, marking signals are applied to the stylus only when relay EMD is energized.

The stylus motor SM receives its normal driving power from a synchronous power amplifier 604, under control of a motor stabilization circuit 605, fully disclosed in the aforesaid Diebert et al. application. The circuit for motor SM extends from the lower terminal of the secondary winding of the output transformer 606 through a conductor 607, the lower-outer front contact and armature of a sterling relay ST on Fig. 41, a conductor 608, the normally closed safety switch 516 to the winding of stylus belt motor SM, thence by conductor 610, the lower-inner armature and front contact of relay ST and a conductor 611 to the upper terminal of the secondary winding of the transformer 606. As will be later explained, the motor SM is supplied for a brief starting interval with power from the A. C. mains rather than through the synchronous power amplifier.

In addition to the end-of-message detector relay EMD and the starting relay ST referred to, the recorder relay arrangement includes a run relay RR, a fast feed relay FF, and a knife motor relay KNF. When the power is turned on and a standby signal is received, all of the above relays are deenergized.

When the standby signal is terminated, relay EMD becomes energized, as previously described, and completes a circuit for the stylus belt motor SM from the A. C. mains. This circuit extends from the high side of the A. C. line through conductor 612, conductor 613, the upper-inner armature and front contact of relay EMD, conductor 614, a current limiting resistor 615, the lower-outer back contact and armature of relay ST, conductor 608, normally closed switch 156, the winding of motor SM, conductor 610, the lower-inner armature and back contact of relay ST, conductor 616, conductor 618 and conductor 620 to ground. It is evident, therefore, that stylus belt drive motor SM is started from the A. C. mains.

Energization of relay EMD also applies power to a delay network included in the starter anode circuit of a glow discharge tube 622. The circuit therefor extends from the high side of the A. C. line through conductor 612, conductor 613, the upper-inner armature and front contact of relay EMD, conductor 614, a resistor 623, a rectifier 624, a variable resistor 625, a capacitor 626, the winding of relay ST, conductor 616, conductor 618 and conductor 620 to ground. The junction of resistor 625 and capacitor 626 is coupled to the starter anode of tube 622 through a resistor 628. After a predetermined time interval depending on the charging time constant for capacitor 626, the voltage thereacross rises to a value sufficiently high to fire tube 622. The main discharge path of tube 622 is connected across resistor 625 and capacitor 626 so that, when tube 622 fires, relay ST becomes energized through the charging circuit for capacitor 626 described above.

It will be remembered that the terminals of stylus motor SM are connected respectively to the lower armatures of relay ST. Since the lower front contacts of relay ST are connected through conductors 607 and 611, respectively, to the synchronous power amplifier output transformer 606 on Fig. 43, energization of relay ST shifts motor SM from the A. C. line to the synchronous power amplifier. The high side of the secondary winding of transformer 630, which supplies the input signal to the synchronous power amplifier, is connected to ground through a conductor 632 and upper-inner armature and back contact of relay ST. As a result, there is no input to the synchronous power amplifier until this ground is removed by operation of relay ST.

It should be noted that when relay ST is energized, the main discharge path of tube 622 is shorted and relay ST locked up through its own upper-outer armature and front contact.

In accordance with the disclosure of the Diebert et al. application, the standby 12.5 kc. tone is followed by a phasing signal which brings the stylus belt motor into proper phase relation to the distant transmitter. The period allowed for this operation is, by way of example, 2½ seconds, and this time is measured by a timer 634. The timer is energized at the start of the phasing signal, by means not shown herein but fully disclosed in the Diebert et al. application, and at the end of the allowed phasing period the timer closes its contacts 636. This completes a circuit for the run relay RR, extending from the high side of the A. C. line through conductor 612, contacts 636 of times 634, a conductor 638, the winding of relay RR, a conductor 640 and conductor 620 to ground. When energized, relay RR locks up through a circuit extending from the high side of the A. C. line through conductors 612 and 613, the upper-inner armature and front contact of relay EMD, conductor 614, the upper-outer armature and front contact of relay RR, the winding of relay RR, and conductors 640 and 620 to ground. Timer contacts 636 are opened on start of the facsimile intelligence signals.

Operation of relay RR completes an energizing circuit for the platen advance motor 296 and the normal feed motor 330. This circuit extends from the high side of the A. C. line through conductor 612, a conductor 642, the lower-outer armature and back contact of relay KNF, the center-lower front contact and armature of relay RR, a conductor 664, the winding of platen motor 296, a conductor 666 and conductor 620 to ground. The operating winding of normal feed motor 330 is connected in parallel with the winding of platen motor 296. Platen advance motor 296, as heretofore described, serves to maintain the recording copy sheet at the proper operating position relative to the recording styluses only during operation of the normal feed motor, that is while a message is being recorded. Normal feed motor 330 serves to advance the recording copy sheet past the recording styluses at the proper rate relative to the scanning speed of the transmitter.

Energization of relay RR also closes the circuit of the primary winding of high voltage transformer 668, applying the high voltage to the recording amplifier power supply for providing operating potentials for the facsimile recording amplifier embodied in the circuit group 582. The circuit of the primary winding of transformer 668 extends from one of the A. C. line terminals 670 through the primary winding of transformer 668, a conductor 672, the lower-inner armature and front contact of relay RR, and the lower-inner back contact and armature of relay ENF to the other A. C. line terminal.

Energization of relay RR also energizes fast feed relay FF through a circuit extending from the high side of the A. C. line on Fig. 43 through conductor 612, a conductor 674, the upper-inner armature and front contact of relay RR, the winding of relay FF and conductors 616, 618 and 620 to ground. When energized, relay FF locks up through a circuit extending from the high side of the A. C. line through conductor 612, a conductor 676, tongue 677 and contact 678 of twin meter switch 408, a conductor 679, the upper-inner armature and front contact of relay FF, the winding of relay FF and conductors 616, 618 and 620 to ground.

At the conclusion of the message, if it is to be immediately followed by another, an end-of-message signal consisting of a short pulse of the 12.5 kc. tone is received. This end-of-message tone reduces the anode current of tube 587 in Fig. 42 in a manner described hereinbefore, causing end-of-message relay EMD to release and remain released during the duration of the end-of-message tone. Release of relay EMD breaks the locking circuit for run relay RR at the upper-inner armature and front contact of relay EMD, releasing relay RR.

Release of relay RR removes power from normal feed motor 330 and platen motor 296 at the lower-center armature and front contact of relay RR. Similarly, the primary circuit of the high voltage transformer 668 of the recording amplifier is opened at the lower-inner armature and front contact of relay RR. When the energizing circuit for relay ST is opened at the upper-inner front contact and armature of relay EMD, a capacitor 680, which is connected in parallel with the winding of relay ST when relay ST is energized, makes relay ST slow-to-release and holds it up for the duration of the end-of-message tone, ensuring continued operation of stylus belt motor SM between messages being transmitted in rapid sequence.

The operation of the paper feed and knife mechanisms occur at the end of the message and is determined by the setting of the random length switch 470. Switch 470 has a tongue 682, a random length contact 683 and a fixed length contact 684. If switch 470 is in the random length portion, i. e., tongue 682 made with contact 683, power is applied to the paper feed meter clutch magnet 378 when the end-of-message tone is received and upon the release of relay RR. The energizing circuit extends from the high side of the A. C. line through conductor 612, a rectifier 686, a resistor 687, a conductor 688, the lower-outer armature and back contact of relay RR, a conductor 689, contact 683 and tongue 684 of switch 470, a conductor 691, the lower front contact and armature of relay FF, a conductor 692, clutch magnet 378 and conductor 620 to ground.

When energized, clutch magnet 378 causes the cam 396 (Fig. 37) to be clutched with the feed roller 223, as heretofore described, and after the desired amount of paper, as determined by the cam adjustment, has been fed out, the cam strikes and opens contact 678 and tongue 677 of meter switch 408.

It will be remembered that normal feed motor 330 was deenergized when relay RR was released in response to receipt of the end-of-message tone. Feeding of the message blank upon release of relay RR is effected by a fast feed motor 348. Consequently the normal feed and fast feed motors cannot be energized at the same time. Motor 348 is energized through a circuit extending from the high side of the A. C. line through conductor 612, conductor 674, the upper-inner armature and back contact of relay RR, the upper-outer front contact and armature of fast feed relay FF, a conductor 694, the winding of fast feed motor 348, a conductor 695 and conductor 620 to ground. During operation of the fast feed motor the platen 236 is retracted from the path of the styluses by interruption of the circuit to the platen motor 296 on release of relay RR.

When the cam opens contact 678 and tongue 677 of meter switch 408, it opens the locking circuit for relay FF. Release of relay FF in turn removes power from fast feed motor 348 and from the magnetic clutch 378. When the cam operates switch 408, it also closes another tongue 696 and another contact 697 thereof, thus completing an energizing circuit for knife relay KNF. This circuit extends from the high side of the A. C. line through conductors 612 and 676, tongue 696 and contact 697, a conductor 698, the winding of relay KNF and conductors 618 and 620 to ground. When energized, relay KNF locks up through a circuit extending from the high side of the A. C. line through a conductor 700, a knife switch 518, a conductor 701, the upper-inner armature and front contact of relay KNF, the winding of relay KNF and conductors 618 and 620 to ground. This locking circuit is necessary because meter switch 408 will be operated for only a short time, it being released as the operating cam 396 of switch 408 is returned to normal upon release of the magnetic clutch 378.

Energization of relay KNF completes an energizing circuit for the knife motor 514, the circuit extending from the high side of the A. C. line through conductors 612 and 674, the upper-inner armature and back contact of relay RR, the upper-outer front contact and armature of relay KNF, a conductor 702, the winding of knife motor 514, a conductor 703 and conductor 620 to ground. Knife motor 514 operates both the knife blade 484 to cut the message blank, and the cut message delivery mechanism, as previously described. As the knife blade driving mechanism completes its cycle after having cut the message blank, it opens switch 518, releasing relay KNF and removing power from knife motor 514.

If random length switch 470 is set in the fixed length position thereof, i. e., with tongue 682 made with contact 684, the paper feed clutch magnet 378 is energized at the start of message reception upon energization of relay FF. The circuit for the clutch magnet extends from the high side of the A. C. line through conductor 612, rectifier 686, resistor 687, contact 684 and tongue 682 of switch 470, conductor 691, the lower front contact and armature of relay FF, conductor 692, clutch magnet 378 and conductor 620 to ground. In this method of operation, the cam starts to meter the paper feed as soon as message recording begins. The cam may be adjusted to meter any desired length of message blank. When the end-of-message signal is received, the fast feed motor speeds up the message blank dispensing until the total desired length of message blank has been dispensed, at which time the magnetic clutch cam 396 opens switch contact 697, shutting off the fast feed motor and initiating the knife cycle as before. It is evident that with switch 470 in its "Random length" position, a given length of message blank will be fed out after receipt of the end-of-message signal regardless of the actual length of the message. In the fixed length position of switch 470, a given length of message blank will be fed out, the proportion between the amount fed out by the normal feed motor and the amount fed out by the fast feed motor depending on the length of the message relative to the message blank length as determined by the setting of the meter wheel. For example, if the wheel is adjusted for a fixed length of eight inches, and a five inch message is received, the fast feed motor will feed out three more inches before the message blank is cut by the knife.

When a message is not succeeded by another message, a standby tone will be received instead of the end-of-message tone. The standby tone will hold relay EMD in its deenergized condition for a time interval sufficiently long for capacitor 680 to discharge, releasing relay ST. When relay ST releases, stylus belt motor SM is disconnected from the synchronous power amplifier at the lower armatures and front contacts of relay ST. Motor SM will not be connected to the A. C. line, however, since the circuit therefor includes the upper-inner front contact and armature of deenergized relay EMD. It will be noted that the fast feed and kife motors operate on receipt of the 12.5 kc. tone whether it be an end-of-message or a standby signal. Hence the message blank will be fed out and cut off regardless of whether a succeeding message is to be received. When a succeeding message is not to be received, the circuit will return to its initial condition upon completion of the paper cutting and delivery cycle. It will be remembered that in this initial condition a standby signal is being received and all motors and all relays shown are deenergized.

It will be remembered that D. C. power is supplied to the tongue of low paper switch 572. This power is normally supplied through a back contact of switch 572 and conductor 600 to relay EMD and its associated apparatus. When the message blank supply becomes too low, the tongue of switch 572 is operated to its front or right hand contact, supplying power to an alarm light 705 and preventing power from being applied to relay EMD after the locking circuit therefor releases. In other words, after the end of the message during which the message blank supply has become too low, relay EMD will not operate to initiate a new recorder cycle.

It will be appreciated that the operation of the recorder at the extremely high speeds for which it was designed and with a short interval of 2½ seconds between successive messages is dependent upon close interrelation and cooperation of all of the functions performed. The very high belt speed imposes severe conditions in regard to belt strain and in uniformity of the path of travel of the several styluses, which conditions are met in part by the stylus belt driving and guiding mechanism and the stylus mounting, adjusting and guiding means, and in part by the paper feed and guiding means and the platen structure and its retracting, advancing and pressure adjusting features for producing the proper cooperative alignment and pressure of the recording surface with the rapidly moving styluses. The fast feed, metering, severing and cut blank delivery mechanism are essential to this organization in order to get the recorded message out of the machine and a new portion of the continuous paper web in recording position and all of the other mechanisms restored to normal in readiness to respond to a new message in the very short interval that can be allotted between messages consistent with the desired high speed of operation.

Obviously, many modifications in the structure disclosed may be made while still retaining the essential cooperative relationship, and I contemplate all such structural changes as coming within the scope of the appended claims.

What is claimed is:

1. Facsimile scanning mechanism comprising an endless belt supported for rotary movement, a plurality of stylus units rigidly mounted on said belt so that the stylus of each unit travels in a linear scanning path, a rigid guide member arranged in supporting engagement with the underside of the belt along one edge thereof, a second rigid guide member mounted along the other edge of the belt but out of contact with the belt, said second guide member having a straight edge arranged to engage said stylus units during their scanning travel, and stationary cantilever leaf spring means arranged to exert a constant sliding pressure on each stylus unit while scanning to hold the styluses in uniform pressure contact with the second guide member, whereby the successive styluses are constrained to travel the same scanning path.

2. Facsimile scanning mechanism comprising an endless belt supported for rotary movement, a plurality of stylus units rigidly mounted on said belt so that the stylus of each unit travels in a linear scanning path on the upper run of the belt, an elongated block supported beneath the upper run of the belt and parallel thereto, a vertical guide bar attached to one side of the block and having its top edge in supporting contact with the underside of the belt along one edge thereof, a second vertical guide bar attached to the opposite side of said block and out of contact with the belt, the second guide bar having a straight top edge arranged to engage the under surface of the stylus units during their scanning travel, and a long leaf spring mounted parallel to the belt for exerting a constant downward pressure on each stylus unit while in scanning position to hold the styluses in uniform pressure contact with the second guide bar, whereby the successive styluses are constrained to travel the same scanning path.

3. Facsimile scanning mechanism comprising an endless belt supported for rotary movement, a plurality of styluses rigidly mounted on said belt so as to travel in a linear scanning path on the upper run of the belt, a fixed guide member arranged in supporting engagement with the front underside of the belt along its upper run, a second guide member fixed along the rear edge of the upper run of the belt but out of contact with the belt, said second guide member having a straight top edge arranged to engage the under surface of the styluses during their scanning travel, and stationary cantilever leaf spring means adapted to exert a constant downward pressure on each stylus while in scanning position to hold the stylus in uniform pressure contact with the second guide member, whereby the successive styluses are constructed to traverse the same scanning path.

4. Facsimile scaning mechanism comprising an endless belt supported for rotary movement, a plurality of styluses rigidly mounted on said belt so as to travel in a linear scanning path on the upper run of the belt, an elongated block supported beneath the upper run of the belt and parallel thereto, a vertical guide bar attached to one side of the block and having its top edge in supporting contact with the front underside of the belt, a second vertical guide bar attached to the opposite side of said block and out of contact wtih the belt, the second guide bar having a straight top edge arranged to engage the under surface of the styluses during their scanning travel, and a long leaf spring mounted parallel to the belt for exerting a constant downward pressure on each stylus while in scanning position to hold the stylus in uniform pressure contact with the second guide bar, whereby the successive styluses are constrained to travel the same scanning path.

5. In facsimile scanning mechanism, an endless belt supported for rotary movement, a plurality of stylus units mounted on the belt in spaced relation, each unit comprising a plate fixed on top of the belt and carrying a stylus, said plate having an open groove on top in which the stylus lies exposed above the plate and is held at the proper scanning angle, means on said plate for releasably securing the stylus in place, the scanning end of the stylus extending beyond said plate, means for supporting the upper run of the belt in a straight line for scanning, a guide bar arranged to engage the scanning end of each stylus on the upper run of the belt, and a leaf spring supported along one edge parallel to the upper run of the belt and having its free edge pressing down on the exposed styluses which are thereby held in uniform pressure contact with said guide bar and forced to traverse the same linear scanning path.

6. In facsimile scanning mechanism, an endless belt supported by a pair of motor driven pulleys, a plurality of stylus units rigidly mounted on the belt in spaced relation, a guide bar arranged parallel to the upper run of the belt and engaging the underside of the belt along its front edge, a second guide bar arranged parallel to the upper run of the belt along the rear edge of the belt at its upper run but out of contact with the belt, said second guide bar having a straight edge arranged to engage said stylus units during their scanning travel over the upper run of the belt, and a stationary leaf spring engaging the stylus units about midway between said guide bars to hold the stylus units in pressure contact with the second bar which cooperates with the stylus units to support the upper run of the belt along its rear edge.

7. In facsimile scanning mechanism, an endless belt supported for rotary movement, a plurality of stylus units mounted on said belt in spaced relation, each unit comprising a plate fixed on top of the belt and extending rearward beyond the belt, said plate having a groove for holding a wire stylus in scanning position, means on said plate for releasably clamping the stylus in said groove, a guide bar arranged to engage the underside of said plates on the upper run of the belt, and a leaf spring supported along one edge parallel to the upper run of the belt and having its free edge pressing down on said plates which are thereby held in uniform pressure contact with said guide bar, so that the styluses are constrained to traverse the same linear scanning path.

8. Facsimile scanning mechanism comprising an endless belt supported on a pair of motor driven pulleys for rotation at high speed, a plurality of stylus units rigidly mounted on said belt, the stylus of each unit traveling in a linear scanning path on the upper run of the belt, a rigid guide bar mounted between said pulleys in supporting engagement with the underside of the belt along one edge of its upper run, said guide bar being arranged to support the straight upper run of the belt slightly above the tangential pulley line so that the belt on leaving and approaching the pulleys follows the natural curved path caused by centrifugal force due to the high pulley speed, whereby undue strains in the belt are prevented, a second guide bar mounted along the other edge of the belt and out of contact therewith, whereby the frictional belt load on the pulley motor is reduced to a minimum, and means for holding the stylus units in pressure contact with the second guide bar during their scanning travel, whereby said other edge of the belt in its upper run is supported by the second guide bar through the stylus units.

9. In a facsimile stylus recorder, the combination of a platen adapted to support a sheet of recording paper in flat condition for linear scanning, said platen being constructed to hold the left or entry edge of the sheet curved back, an endless belt mounted on a pair of motor driven pulleys, means for supporting a certain length of the upper run of said belt in a straight line which is longer than the width of the sheet, a plurality of spaced stylus holders mounted rigidly on the belt and adapted each to support a stylus in position to contact a sheet on the platen when the styluses are on the straight upper run of the belt, and means for supporting said pulleys in such relation to a sheet on the platen that the entering stylus first touches the curved edge of the paper only after the belt has left the pulley and straightened out on its supported upper run, whereby the straight entry motion of the stylus point on the sheet prevents injury to the paper and provides a smooth scanning movement of the stylus across the flat sheet.

10. In a facsimile stylus recorder, a frame carrying a pair of pulleys, an endless belt mounted on said pulleys, a plurality of stylus holders fixed to said belt in evenly spaced relation, means on each holder for supporting a stylus in axially adjustable position, a motor mounted on said frame and connected to one of said pulleys for driving the belt at scanning speed, a stylus gauge lever pivoted on said frame near one of said pulleys and carrying a stop arranged to be engaged by the point of a stylus when the latter is in correct position on its holder, manually operable means for swinging said lever into and out of stylus engaging position, said means including connections which automatically hold the lever in adjusted position, a switch controlled by said gauge lever to prevent said motor from running while the lever is in stylus-engaging position, and means whereby the movement of said lever to withdrawn position automatically operates said switch to put the motor circuit in condition to be energized.

References Cited in the file of this patent

UNITED STATES PATENTS

| | | |
|---|---|---|
| 1,564,634 | Side | Dec. 8, 1925 |
| 1,604,732 | Au | Oct. 26, 1926 |
| 2,141,975 | Finch | Dec. 27, 1938 |
| 2,261,316 | Weller | Nov. 4, 1941 |
| 2,278,919 | Erickson et al. | Apr. 7, 1942 |
| 2,397,562 | Potter | Apr. 2, 1946 |
| 2,398,352 | Beach et al. | Apr. 16, 1946 |
| 2,464,970 | Finch | Mar. 22, 1949 |
| 2,530,739 | Stamper | Nov. 21, 1950 |
| 2,590,554 | Lukacs | Mar. 25, 1952 |
| 2,591,138 | Cooley | Apr. 1, 1952 |
| 2,621,999 | Alden | Dec. 16, 1952 |
| 2,639,211 | Hallden et al. | May 19, 1953 |
| 2,715,055 | Fryklund | Aug. 9, 1955 |